United States Patent
Semenov

(10) Patent No.: US 11,074,442 B2
(45) Date of Patent: Jul. 27, 2021

(54) IDENTIFICATION OF TABLE PARTITIONS IN DOCUMENTS WITH NEURAL NETWORKS USING GLOBAL DOCUMENT CONTEXT

(71) Applicant: ABBYY Production LLC, Moscow (RU)

(72) Inventor: Stanislav Semenov, Moscow (RU)

(73) Assignee: Abbyy Production LLC, Moscow (RU)

( * ) Notice: Subject to any disclaimer, the term of this patent is extended or adjusted under 35 U.S.C. 154(b) by 111 days.

(21) Appl. No.: 16/593,217

(22) Filed: Oct. 4, 2019

(65) Prior Publication Data

US 2021/0064861 A1   Mar. 4, 2021

(30) Foreign Application Priority Data

Aug. 29, 2019   (RU) .......................... RU2019127233

(51) Int. Cl.
```
G06K 9/00      (2006.01)
G06F 17/16     (2006.01)
G06K 9/34      (2006.01)
```
(52) U.S. Cl.
CPC ......... *G06K 9/00456* (2013.01); *G06F 17/16* (2013.01); *G06K 9/00449* (2013.01);
(Continued)

(58) Field of Classification Search
CPC ... G06K 9/00442–00483; G06K 9/344; G06K 2209/01; G06F 17/16
See application file for complete search history.

(56) References Cited

U.S. PATENT DOCUMENTS 7,370,034 B2   5/2008   Franciosa et al.
8,265,925 B2   9/2012   Aarskog
(Continued)

FOREIGN PATENT DOCUMENTS

WO   2013135474 A1   9/2013

OTHER PUBLICATIONS

Katti, Anoop R, et al., "Applying Sequence-to-Mask Models for Information Extraction from Invoices", 13th IAPR International Workshop on Document Analysis Systems, Short Papers Booklet DAS, Vienna, Austria, Apr. 24-27, 2018, pp. 9-10.
(Continued)

*Primary Examiner* — Sean T Motsinger
(74) *Attorney, Agent, or Firm* — Lowenstein Sandler LLP

(57) ABSTRACT

Aspects of the disclosure provide for mechanisms for identification of table partitions in documents using neural networks. A method of the disclosure includes obtaining a plurality of symbol sequences of a document having at least one table, determining a plurality of vectors representative of symbol sequences having at least one alphanumeric character or a table graphics element, processing the plurality of vectors using a first neural network to obtain a plurality of recalculated vectors, determining an association between a first recalculated vector and a second recalculated vector, wherein the first recalculated vector is representative of an alphanumeric sequence and the second recalculated vector is associated with a table partition, and determining, based on the association between the first recalculated vector and the second recalculated vector, an association between the alphanumeric sequence and the table partition.

20 Claims, 9 Drawing Sheets

(52) U.S. Cl.
CPC ......... *G06K 9/00463* (2013.01); *G06K 9/344* (2013.01); *G06K 2209/01* (2013.01)

(56) References Cited

U.S. PATENT DOCUMENTS

| | | | |
|---|---|---|---|
| 8,726,148 | B1 | 5/2014 | Battilana |
| 8,923,618 | B2 | 12/2014 | Kutsumi |
| 10,360,507 | B2* | 7/2019 | Aravamudan ......... G16B 50/00 |
| 10,467,464 | B2* | 11/2019 | Chen ....................... G06K 9/46 |
| 10,558,712 | B2 | 2/2020 | Zholudev et al. |
| 2016/0148074 | A1* | 5/2016 | Jean ..................... G06K 9/4676 382/190 |
| 2017/0061250 | A1* | 3/2017 | Gao ..................... G06N 3/0454 |
| 2018/0181808 | A1* | 6/2018 | Sridharan .......... G06K 9/00483 |
| 2019/0266394 | A1* | 8/2019 | Yu ....................... G06K 9/00449 |
| 2019/0294874 | A1* | 9/2019 | Orlov .................. G06K 9/6218 |
| 2019/0294921 | A1* | 9/2019 | Kalenkov .......... G06K 9/00201 |
| 2019/0361972 | A1* | 11/2019 | Lin ....................... G06F 40/177 |
| 2019/0385001 | A1* | 12/2019 | Stark .................... G06K 9/6271 |
| 2020/0327351 | A1* | 10/2020 | Abedini ............... G06K 9/3258 |
| 2021/0012102 | A1* | 1/2021 | Cristescu ............. G06F 16/56 |
| 2021/0019512 | A1* | 1/2021 | Uppal .................... G06F 16/93 |
| 2021/0064861 | A1* | 3/2021 | Semenov ............... G06F 17/16 |
| 2021/0064908 | A1* | 3/2021 | Semenov ................ G06K 9/46 |

OTHER PUBLICATIONS

Palm, Rasmus Berg, et al., "CloudScan—A Configuration-Free Invoice Analysis System Using Recurrent Neural Networks", IEEE, 2017 14th IAPR International Conference on Document Analysis and Recognition (ICDAR), Aug. 24, 2017, 8 pages.

Raoui-Outach, Rizlene, et al., "Deep Learning for Automatic Sale Receipt Understanding", IEEE, Dec. 5, 2017, 7 pages.

Zuev, Konstantin, et al. U.S. Appl. No. 16/017,683, "Text Field Detection Using Neural Networks", filed Jun. 25, 2018.

Mozharova, V., Lukashevich N., "Investigation of features for extraction of named entities from texts in Russian", https://patents.google.com/scholar/16285686872319998042?q=text+field+entry+word+extraction+detection+connection+key+hyphotesys+learning&scholar&oq=text+field+entry+word+extraction+detection+connection+key+hyphotesys+learning, 2017, 2 Pages.

Ma, Edward, "3 subword algorithms help to improve your NLP model performance, Introduction to subword", https://medium.com/@makcedward/how-subword-helps-on-your-nlp-model-83dd1b836f46, May 18, 2019, 7 pages.

Sandhan, et al, Indian Institute of Technology, Kanpur, UP, India, "Revisiting the Role of Feature Engineering for Compound Type Identification in Sanskrit", https://www.aclweb.org/anthology/W19-7503.pdf, 17 pages.

* cited by examiner

IDENTIFICATION OF TABLE PARTITIONS IN DOCUMENTS WITH NEURAL NETWORKS USING GLOBAL DOCUMENT CONTEXT

RELATED APPLICATIONS

This application claims the benefit of priority under 35 USC 119 to Russian patent application No. RU2019127233, filed Aug. 29, 2019.

TECHNICAL FIELD

The implementations of the disclosure relate generally to computer systems and, more specifically, to systems and methods for detecting text fields in unstructured electronic documents using neural networks.

BACKGROUND

Detecting text fields in an unstructured electronic document is a foundational task in processing, storing, and referencing documents. Conventional approaches for field detection may involve the use of a large number of manually configurable heuristics and may thus require many human operations.

SUMMARY OF THE DISCLOSURE

Implementations of the present disclosure describe mechanisms for detecting text fields and tables in unstructured electronic documents using neural networks.

A method of the disclosure includes: obtaining a plurality of symbol sequences of a document, the document having at least one table, wherein each symbol sequence comprises at least one of an alphanumeric character or a table graphics element, determining a plurality of vectors, wherein a vector of the plurality of vectors is representative of one of the plurality of symbol sequences, processing, by a processing device, the plurality of vectors using a first neural network to obtain a plurality of recalculated vectors, wherein each of the plurality of recalculated vectors is recalculated based on values of the plurality of vectors, determining, by the processing device, an association between a first recalculated vector of the plurality of recalculated vectors and a second recalculated vector of the plurality of recalculated vectors, wherein the first recalculated vector is representative of an alphanumeric sequence and the second recalculated vector is associated with a table partition, and determining, based on the association between the first recalculated vector and the second recalculated vector, an association between the alphanumeric sequence and the table partition.

A system of the disclosure includes a memory, and a processing device operatively coupled to the memory, the processing device to: obtain a plurality of symbol sequences of a document, the document having at least one table, wherein each symbol sequence comprises at least one of an alphanumeric character or a table graphics element, determine a plurality of vectors, wherein a vector of the plurality of vectors is representative of one of the plurality of symbol sequences, process, by a processing device, the plurality of vectors using a first neural network to obtain a plurality of recalculated vectors, wherein each of the plurality of recalculated vectors is recalculated based on values of the plurality of vectors, determine, by the processing device, an association between a first recalculated vector of the plural- ity of recalculated vectors and a second recalculated vector of the plurality of recalculated vectors, wherein the first recalculated vector is representative of an alphanumeric sequence and the second recalculated vector is associated with a table partition, and determine, based on the association between the first recalculated vector and the second recalculated vector, an association between the alphanumeric sequence and the table partition.

A non-transitory machine-readable storage medium of the disclosure includes instructions that, when accessed by a processing device, cause the processing device to: obtain a plurality of symbol sequences of a document, the document having at least one table, wherein each symbol sequence comprises at least one of an alphanumeric character or a table graphics element, determine a plurality of vectors, wherein a vector of the plurality of vectors is representative of one of the plurality of symbol sequences, process, by a processing device, the plurality of vectors using a first neural network to obtain a plurality of recalculated vectors, wherein each of the plurality of recalculated vectors is recalculated based on values of the plurality of vectors, determine, by the processing device, an association between a first recalculated vector of the plurality of recalculated vectors and a second recalculated vector of the plurality of recalculated vectors, wherein the first recalculated vector is representative of an alphanumeric sequence and the second recalculated vector is associated with a table partition, and determine, based on the association between the first recalculated vector and the second recalculated vector, an association between the alphanumeric sequence and the table.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
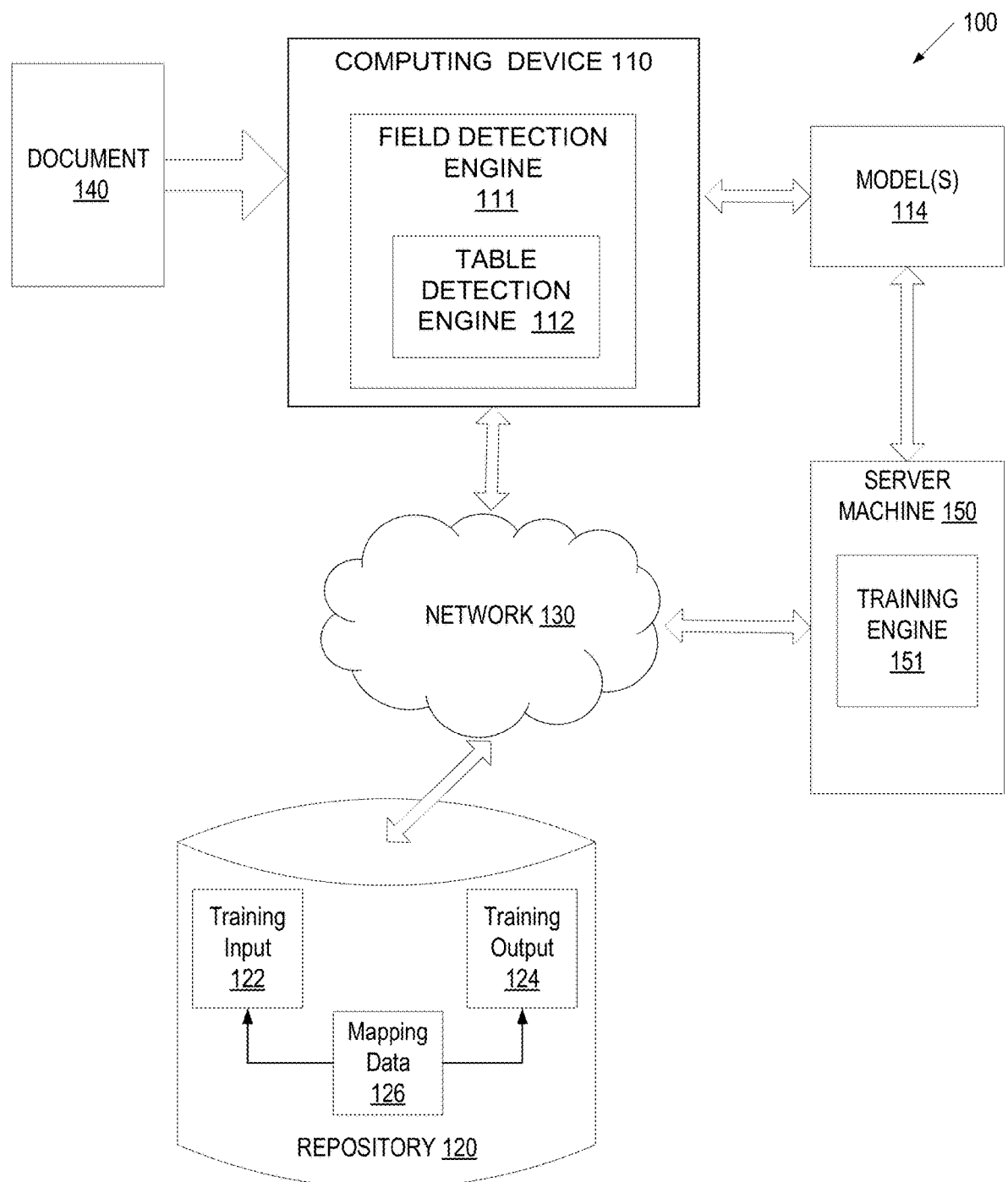
FIG. 1 is a block diagram of an example computer system in which implementations of the disclosure may operate.

Implementations for detecting fields and tables in unstructured electronic documents using neural networks are described. One conventional approach for identifying fields and corresponding field types in such documents is based on heuristics. In the heuristic approach, a large number (e.g., hundreds) of documents, such as restaurant checks or receipts, for example, are taken and statistics are accumulated regarding what text (e.g., keywords) can be used next to a particular field and where this text can be placed relative to the field (e.g., within the field, to the right, left, above, below it). For example, the heuristic approach can track what word or words are frequently located within or next to the field indicating the total purchase amount, what word or words are within or next to the field indicating applicable taxes, what word or words are within or next to the field indicating the total payment on a credit card, etc. Based on these statistics, when processing a new check, it can be determined which data detected on the document corresponds to a particular field. The heuristic approach does not always work precisely, however, because if for some reason a check has been recognized with errors, namely in the word combinations "TOTAL TAX" and "TOTAL PAID" the words "tax" and "paid" were poorly recognized, the corresponding values might be miscategorized.

Aspects of the disclosure address the above noted and other deficiencies by providing mechanisms for identification of fields and/or tables in documents using neural networks. The mechanisms can automatically detect fields and/or tables contained in a document and associate each of the fields with a field type. As used herein, "unstructured electronic document" (also referred to simply as "document" herein) may refer to any document whose image may be accessible to a computing system that performs identification of fields and/or tables. The image may be a scanned image, a photographed image, or any other representation of a document that is being capable of being converted into a data form accessible to a computer. For example, "unstructured electronic document" may refer to a file comprising one or more digital content items that may be visually rendered to provide a visual representation of the electronic document (e.g., on a display or a printed material). In accordance with various implementations of the present disclosure, a document may conform to any suitable electronic file format, such as PDF, DOC, ODT, JPEG, etc. Although the document may be represented in an electronic (e.g., digital) file format, it is presumed that the document is not electronically structured and that the document layout—locations of various text fields, tables, etc.—is not specified in the electronic file. (As, for example, would be the case if the document were originally issued in an electronic format—an e-invoice or other similar electronic documents—with the locations of the fields and tables already specified.)

A document may represent a financial document, a legal document, or any other document, e.g., a document that is produced by populating fields with text symbols (e.g., words) or images. A document may represent a document that is printed, typed, or handwritten (for example, by filling out a standard form). A document may represent a document that has a variety of fields, such as text fields (containing numerals, numbers, letters, words, sentences), graphics field (containing a logo or any other image), tables (having rows, columns, cells), and so on. As used herein, "text field" may refer to a data field in document that contains alphanumeric characters. A "table" may refer to any graphical structure, e.g. a structure formed by lines. The lines may define a plurality of rows (e.g., when lines are horizontal), a plurality of columns (e.g., when lines are vertical), or a plurality of cells (e.g., defined by vertical and horizontal lines, if both are present in a document). The disclosed implementations may also be applied to documents that include tables defined by oblique lines. Such instances may occur as a result of a document design or because of a misalignment that happens during imaging of the document. A table may include cells containing other fields, such as any fields populated with alphanumeric characters, and/or fields that contain images (such as logos), etc.

As used herein, "field type" may refer to a type of content included in a filed. For example, a text field type may be "name," "company name," "telephone," "fax," "address," "vendor name," "type of payment," "method of payment," "type of merchandize," "quantity of merchandize," or any other entry that may be present in a document. An image field may include a company logo, a signature, an image of a merchandize used in place of (or in addition to) a description of the merchandize, or any other image that may be included in a document.

The techniques described herein allow for automatic detection of fields in documents using artificial intelligence. The techniques may involve training a neural network to detect fields in documents and may classify fields into predefined classes. Each of the predefined classes may correspond to a field type. The neural network may include multiple neurons that are associated with learnable weights and biases. The neurons may be arranged in layers. The neural network may be trained on a training dataset of documents that contain known fields and/or tables. For example, the training data set may include examples of documents containing one or more fields/tables as training inputs and one or more field type and/or table identifiers that correctly correspond to the one or more fields/tables as training outputs. The neural network may generate an observed output for each training input. The observed output of the neural network may be compared with a training output corresponding to the training input as specified by the training data set, and the error may be propagated back to the previous layers of the neural network, whose parameters (e.g., the weights and biases of the neurons) may be adjusted accordingly. During training of the neural network, the parameters of the neural network may be adjusted to optimize prediction accuracy.

Once trained, the neural network may be used for automatic detection of fields/tables in an input document and selection of the most probable field type of each of the detected fields. The use of neural networks may prevent the need for manual markup of fields, field types, and tables in documents. The mechanisms described herein to detect fields in a document may improve the quality of detection results by performing field detection using a trained neural network in a way that takes into account a context of the entire document. For example, neural networks set and trained in accordance with implementations of this disclosure may be capable of improved accuracy of field/table detection and classification of field types based on what kinds of alphanumeric sequences are found in the entire document. For example, a neural network may identify a numerical sequence in the bottom-left corner of a document enclosed by characteristic boldfaced bar-colon punctuation mark as a bank routing number. Consequently, a neural network trained to take into account a context of the whole document may be capable of more accurately identifying other fields of the same document as, e.g., address, amount, band account number, signature, or other fields typically present on a personal check. A neural network trained in accordance with implementations of this disclosure may be applied to identification of any type of documents and may enable efficient field detection, thus improving both the accuracy of identification as well as the processing speed of a computing device implementing such identification.

FIG. 1 is a block diagram of an example computer system 100 in which implementations of the disclosure may operate. As illustrated, system 100 can include a computing device 110, a repository 120, and a server machine 150 connected to a network 130. Network 130 may be a public network (e.g., the Internet), a private network (e.g., a local area network (LAN) or wide area network (WAN)), or a combination thereof.

The computing device 110 may be a desktop computer, a laptop computer, a smartphone, a tablet computer, a server, a scanner, or any suitable computing device capable of performing the techniques described herein. In some implementations, the computing device 110 can be (and/or include) one or more computing devices 800 of FIG. 8.

A document 140 may be received by the computing device 110. The document 140 may include any suitable text(s), image(s), or table(s), including one or more characters (e.g., letters and/or numbers), words, sentences, etc. The document 140 may be of any suitable type, such as "business card," "invoice," "passport," "medical policy," "questionnaire," etc. The type of the document 140 may be specified by a user and communicated to the computing device 110 together with the document 140, in some implementations.

The document 140 may be received in any suitable manner. For example, the computing device 110 may receive a digital copy of the document 140 by scanning a document or photographing the document. Additionally, in instances where the computing device 110 is a server, a client device connected to the server via the network 130 may upload a digital copy of the document 140 to the server. In instances where the computing device 110 is a client device connected to a server via the network 130, the client device may download the document 140 from the server or from the repository 120.

The document 140 may be used to train a set of machine learning models or may be a new electronic document for which field/table detection and/or classification is desired. In some implementations, if used for training one or more machine learning models 114 for subsequent recognition, the document 140 may be appropriately prepared to facilitate training. For instance, in the document 140, text sequences and/or table elements may be manually or automatically selected, characters may be marked, text sequences/table elements may be normalized, scaled and/or binarized. In some implementations, text in the document 140 may be recognized using any suitable optical character recognition (OCR) technique.

In one implementation, computing device 110 may include a field detection engine 111. The field detection engine 111 may include a table detection engine 112. In some implementations, the table detection engine 112 may be the integrated into the field detection engine so that a single engine is performing both detections. In some implementations, the field detection engine 111 and the table detection engine 112 may be two independent components. In other implementations, the field detection engine 111 and the table detection engine 112 may share some common components (e.g., some neural network functionality) but may have other components designated for use by only one of the engines. The field detection engine 111 and/or the table detection engine 112 may include instructions stored on one or more tangible, machine-readable storage media of the computing device 110 and executable by one or more processing devices of the computing device 110.

In one implementation, the field detection engine 111 and/or the table detection engine 112 may use a set of trained machine learning models 114 for field/table detection and/or classification. The machine learning models 114 are trained and used to detect and/or classify fields/tables in an input document. Some of the machine learning models 114 may be shared by the field detection engine 111 and the table detection engine 112 whereas some models may be used by only one of the engines. In the rest of this disclosure, the term "field detection engine 111" shall be understood to also encompass the table detection engine 112.

The field detection engine 111 may preprocess any documents prior to using the documents for training of the machine learning model(s) 114 and/or applying the trained machine learning model(s) 114 to the documents. In some instances, the trained machine learning model(s) 114 may be part of the field detection engine 111 or may be accessed on another machine (e.g., server machine 150) by the field detection engine 111. Based on the output of the trained machine learning model(s) 114, the field detection engine 111 may detect one or more fields and/or tables in the document and can classify each of the fields into one of a plurality of classes corresponding to predetermined field types.

The field detection engine 111 may be a client-based application or may be a combination of a client component and a server component. In some implementations, field detection engine 111 may execute entirely on the client computing device such as a tablet computer, a smart phone, a notebook computer, a camera, a video camera, or the like. Alternatively, a client component of field detection engine 111 executing on a client computing device may receive an document and transmit it to a server component of the field detection engine 111 executing on a server device that performs the field detection and/or classification. The server component of the field detection engine 111 may then return a recognition result (e.g., a predicted field type of a detected field, or a recognized table, or an association of a word to a table cell) to the client component of the field detection engine 111 executing on the client computing device for storage. Alternatively, the server component of the field detection engine 111 may provide a recognition result to another application. In other implementations, field detection engine 111 may execute on a server device as an Internet-enabled application accessible via a browser interface. The server device may be represented by one or more computer systems such as one or more server machines, workstations, mainframe machines, personal computers (PCs), etc.

Server machine 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training engine 151. The training engine 151 can construct the machine learning model(s) 114 for field detection. The machine learning model(s) 114, as illustrated in FIG. 1, may be trained by the training engine 151 using training data that includes training inputs and corresponding training outputs (correct answers for respective training inputs). The training engine 151 may find patterns in the training data that map the training input to the training output (the answer to be predicted), and provide the machine learning models 114 that capture these patterns. As described in more detail below, the set of machine learning models 114 may be composed of, e.g., a single level of linear or non-linear operations (e.g., a support vector machine [SVM]) or may be a deep neural network, e.g., a machine learning model that is composed of multiple levels of non-linear operations. Examples of deep neural networks are neural networks including convolutional neural networks, recurrent neural networks (RNN) with one or more hidden layers, and fully connected neural networks. In some implementations, the machine learning model(s) 114 may include one or more neural networks as described in connection with FIGS. 2-4.

The machine learning model(s) 114 may be trained to detect text fields in the document 140 and to determine the most probable field type for each of the fields in the document 140. For example, the training engine 151 may generate training data to train the machine learning model(s) 114. The training data may be stored in a repository 120 and include one or more training inputs 122 and one or more training outputs 124. The training data may also include mapping data 126 that maps the training inputs 122 to the training outputs 124. The training inputs 122 may include a training set of documents including text, images, or tables (also referred to as the "training documents"). Each of the training documents may be a document including a known field. The training outputs 124 may be classes representing field types corresponding to the known fields. For example, a first training document in the first training set may include a first known text field (e.g., "John Smith"). The first training document may be a first training input 122 that may be used to train the machine learning model(s) 114. The training output 124 corresponding to the first training input 122 may include a class representing a field type of the known text field (e.g., "name"). During the training of the initial classifier, the training engine 151 can find patterns in the training data that can be used to map the training inputs to the training outputs. The patterns can be subsequently used by the machine learning model(s) 114 for future predictions. For example, upon receiving an input of unknown text fields including unknown text (e.g., one or more unknown words), the trained machine learning model(s) 114 may predict a field type to which each of the unknown text fields belongs and may output a predicted class that identifies the predicted field type as an output.

The repository 120 may be a persistent storage capable of storing documents as well as data structures to perform character recognition in accordance with implementations of the present disclosure. Repository 120 may be hosted by one or more storage devices, such as main memory, magnetic or optical storage based disks, tapes or hard drives, NAS, SAN, and so forth. Although depicted as separate from the computing device 110, in an implementation, the repository 120 may be part of the computing device 110. In some implementations, repository 120 may be a network-attached file server, while in other implementations content repository 120 may be some other type of persistent storage such as an object-oriented database, a relational database, and so forth, that may be hosted by a server machine or one or more different machines coupled to the via the network 130.

In some implementations, the training engine 151 may train an artificial neural network that comprises multiple neurons to perform field detection in accordance with some implementations of the present disclosure. Each neuron may receive its input from other neurons or from an external source and may produce an output by applying an activation function to the sum of weighted inputs and a trainable bias value. A neural network may include multiple neurons arranged in layers, including an input layer, one or more hidden layers, and an output layer. Neurons from adjacent layers are connected by weighted edges. The edge weights are defined at the network training stage based on a training dataset that includes a plurality of documents with known classification of fields. In an illustrative example, all the edge weights may be initially assigned some random values. For every input 122 in the training dataset, the training engine 151 may activate the neural network. The observed output of the neural network $OUTPUT_{NN}$ (TRAINING INPUT) is compared with the desired training output 124 specified by the training data set:

Compare: $OUTPUT_{NN}$ (TRAINING INPUT) vs. TRAINING OUTPUT

The resulting error—the difference between the output of the neural network $OUTPUT_{NN}$ and the desired TRAINING OUTPUT is propagated back to the previous layers of the neural network, in which the weights are adjusted so as to modify the $OUTPUT_{NN}$ and make it closer to the TRAINING OUTPUT. This adjustment may be repeated until the output error for a particular training input 122 satisfies a predetermined condition (e.g., falling below a predetermined threshold). Subsequently, a different training input 122 may be selected, a new $OUTPUT_{NN}$ may be generated, a new series of adjustments may be implemented and so on, until the neural network is trained to a sufficient degree of accuracy. In some implementations, this training method may be applied to training one or more artificial neural networks illustrated in with FIGS. 2-4.

Once the machine learning models 114 are trained, the set of machine learning models 114 can be provided to field detection engine 111 for analysis of new documents. For example, the field detection engine 111 may input a new document 140 and/or features of the document 140 into the set of machine learning models 114. The field detection engine 111 may obtain one or more final outputs from the set of trained machine learning models and may extract, from the final outputs, a predicted field type of the fields detected and/or identify tables in the document 140. The predicted field type may include a probable field type representing a type of a detected field (e.g., "name," "address," "company name," "logo," "email," etc.).

Figure 2:
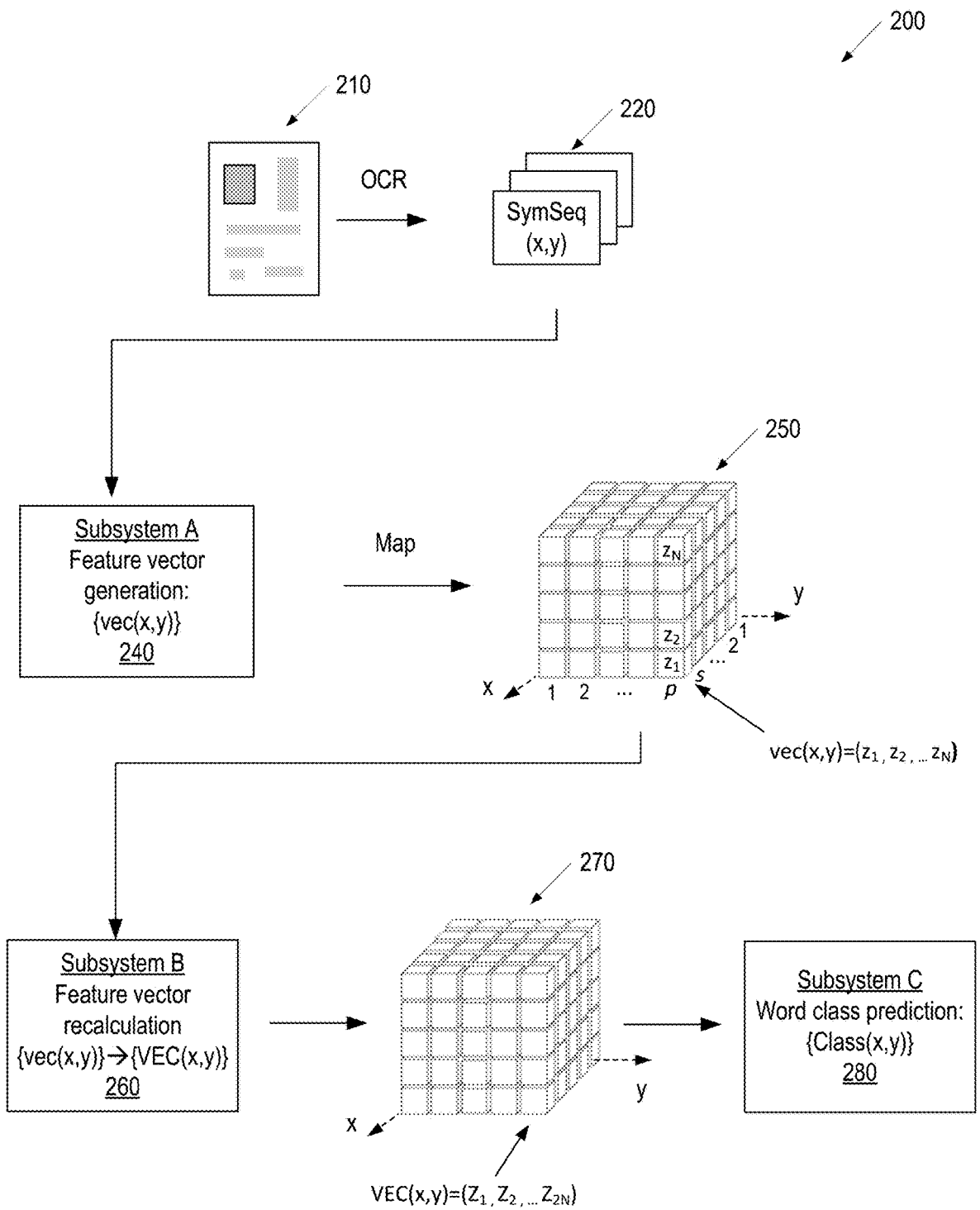
FIG. 2 is a schematic diagram illustrating an example a neural network system that uses global document context for identification of fields and tables, in accordance with some implementations of the present disclosure.

FIG. 2 is a schematic diagram illustrating an example 200 of a neural network system that uses global document context for identification of fields and tables, in accordance with some implementations of the present disclosure. The neural network system 200 may include multiple neurons that are associated with learnable weights and biases. The neurons may be arranged in layers. As illustrated, the neural network system 200 may include a subsystem (subnetwork) A 240, a subsystem B 260, and a subsystem C 280. Each of the subsystems 240, 260, and 280 may include multiple neuron layers and may be configured to perform one or more functions for field/table detection in accordance with the present disclosure.

The neural network system 200 may operate on a document image 210, which may be an image of the document 140, in some implementations. The document image 210 may be obtained by imaging (e.g., scanning, photographing, etc.) of the document 140. The imaging may occur immediately before the document image 210 is processed by the neural network system 200, in some implementations. In some implementations, the imaging may occur at some point in the past, and the document image 210 may be obtained from a local or network (e.g., cloud) storage. The document image 210 may undergo optical character recognition (OCR), either immediately before further processing by the neural network system 200 or at some point in the past. The OCR may be accompanied with pre-processing of the document image 210 to improve its quality, e.g., scaling, changing the aspect ratio, gray-scaling, normalization, data augmentation, amplification, binarization, and so on.

The outcome of the OCR of the document image 210 may be a set of recognized sequences of symbols SymSeq(x,y) associated with the coordinates x, y of the document image 210. The symbol sequences SymSeq may be include one or more alphanumeric characters that may be combined into syllables, words, and/or sentences. The symbol sequences SymSeq may be one or more punctuation marks, such as a comma, period, ellipses, or any other marks. The sequences SymSeq may be horizontal, vertical, or oblique lines of tables, or three-way or four-way intersections of the lines. The lines may be single, double, etc. The symbol sequences SymSeq may be any combinations of characters, punctuation marks, and/or lines. In some implementations, to generate the symbol sequences SymSeq contained in the document image 210, the field detection engine 111 (or any other component that performs or has performed OCR on the document image 210) may use suitable character recognition methods, divide the text of the document into multiple words, and extract multiple character sequences from the words.

The identified symbol sequences SymSeq may be mapped to the corresponding regions of the document image 210 where these sequences are located. For example, each SymSeq may be associated with one or more sets of coordinates (x,y) that identify locations of the sequences. The coordinates may be Cartesian coordinates or any other (e.g., polar) coordinates that may be convenient in identifying locations of the symbol sequences. A single character, punctuation mark, or a short line may be identified by a single set of coordinates (x,y) whereas longer sequences (words, sentences, long lines) may be identified by multiple sets (x,y), such as the coordinates of the four corners of a box enclosing the sequence, in one implementation. A lines may be identified by the coordinates of the two ends of the line. An intersection of two lines (e.g., a three-way or a four-way intersection) may be identified by the coordinates of the ends of all lines as well as the coordinates of the intersection. In this disclosure, (x,y) shall denote any identification of symbol sequences with one or more set of coordinates, as may be needed for a specific SymSeq.

The field detection engine 111 may input the symbol sequences SymSeq(x,y) into the subsystem A 240 to generate feature vector representations for each of the symbol sequences: SymSeq(x,y)→vec(x,y). Each of the feature vectors vec(x,y) may be a symbolic vector embedding of one of the symbol sequences (e.g., words/sentences, punctuation marks and/or lines), which is also referred to as a word embedding. In some implementations, each of the symbolic vector embeddings may have a certain length (e.g., a predetermined length). When the length of a character sequence is shorter than the certain length, predetermined values may be added to generate a symbolic vector embedding of the predetermine length (e.g., zeros may be added to the vectors). "Symbolic vector embedding" or "vector embedding" as used herein may refer to a vector of real numbers or any other numeric representation of a symbol sequence. A vector embedding may be produced, for example, by a neural network implementing a mathematical transformation on symbols (words/punctuation marks/lines of tables) using embedding functions to map such symbols into their numeric representations.

The vector embeddings vec(x,y)—also referred herein as vector representations of symbol sequences SymSec(x,y) or simply as "vectors"—may be generated using any suitable model or combination of models, such as Word2Vec, GloVe, FastText, etc. The subsystem A 240 may use a plurality of neuron layers, such as an input layer, an output layer, and one or more hidden layers. The subsystem A 240 may be a recurrent neural network (RNN), a character-level RNN, a long short-term memory (LSTM) network, or any other similar network, including any combination of such networks. The subsystem A 240 may operate on an embeddings dictionary that may include vector representations of typical words found in the documents of the pertinent types. The subsystem A 240 may be trained to generate such vector representations of symbol sequences SymSeq(x,y) that have close numerical values vec(x,y) for the words that have close semantic meanings (e.g., "number" and "quantity") or that may be found in close proximity to each other (e.g. "amount" and "tendered"). The subsystem A 240 may be previously trained using training inputs 122 and training outputs 124, as described above. The documents used in training phase—the training inputs 122 and training outputs 124—may be the documents of the same type as the target documents (e.g., invoices, checks, purchasing orders, and so on) that are to be used during the prediction phase. Accordingly, while the dictionary for the vector embeddings SymSec(x,y) may be developed during the training phase for the specific class of target documents, the vector embeddings SymSec(x,y) need not belong to an embeddings dictionary pre-trained on some wider class of documents (e.g., books, newspapers, magazines) that are unrelated to the specific class of target documents. The trained first subsystem 240 may be capable of predicting what symbol sequence SymSeq follows (or precedes, or is adjacent along a vertical or horizontal direction) a particular SymSeq. The predictions of the first subsystem 240 may come in the form of probabilities. For example, the trained subsystem A 240 may be able to predict that the word "amount" is preceded with the word "total" with 30% probability and is followed with the word "tendered" with 15% probability.

In some implementations, the output feature vector representations vec(x,y) may be independent of the specific location (x,y) of the symbol sequence SymSeq. More specifically, the coordinates (x,y) of the symbol sequence SymSeq(x,y) may serve as a geometric identifier of the sequence, but its vector representation vec(x,y) may be the same regardless of where in the image the sequence is located. For example, the subsystem A 240 may assign the same probabilities that various character sequences SymSeq (such as "city," state") are found in the proximity of the word "street." In other implementations, the vector representations vec(x,y) of the same symbol sequence SymSeq may differ depending on the location of the sequence within the document (or within the image of the document 210). For example, the output of the subsystem A 240—the vector representations of a word, e.g., "escrow"—may vary depending on the location (x,y) of the word inside the image of the document 210. Accordingly, the vector representation of the word "escrow" may be closer (in the vector space) to representations of one set of words, if the word "escrow" is encountered in the middle of the document, but closer to representations of a different set of words, if the word escrow is found near the bottom of the document. The vector representations of a particular word may further depend on the type of the document. For example, the word "amount" may be represented differently in a real estate contract and in a purchasing order.

As a result, if M symbol sequences (characters, punctuation marks, words, sentences) are identified in the image of the document 210 and input into the subsystem A 240, the output of the first subsystem may be a set of M vectors (feature vectors) $\{vec(x,y)\}$. Each of the M vectors vec(x,y) may depend on the context of the whole document—the type of the document, the number of words in the document, the layout of text in the document, the locations of some or all words in the document, and so on.

The vector space for vectors vec(x,y) may have a number of dimensions N chosen based on the complexity of the document. In some implementations, N may be equal to 128 (32, 64, or any other number). The number N may be chosen to be greater to represent symbol sequences of a complex document and, conversely, smaller for simpler documents having limited dictionary of words. For a given number of dimensions N, each vector may have N components, vec(x, y)=($z_1, z_2, \ldots z_N$), wherein $z_j$ may be a binary number, a decimal number, or any other number accessible to a computer. In some implementations, some of the vectors vec(x, y) determined by the subsystem A 240—e.g., shorter words or punctuation marks—may have fewer than N numbers. In such implementations, the remaining components of the vector may be assigned zero vales, so that the overall length of all vectors may be the same.

The output of the subsystem A 240 may be schematically illustrated as a parallelepiped (cube) 250 composed of the components of individual vectors in the set $\{vec(x,y)\}$. Along the in-plane directions x and y, the area of the document image 210 may be discretized into p cells along the direction of x and s cells along the direction of y (e.g., p=32 and s=64, in one exemplary implementation). A word (character, sentence) centered over a particular cell (x,y) may have its vector representation vec(x,y)=($z_1, z_2, \ldots z_N$) visualized as a sequence of blocks (cells) stacked along the third direction, as shown schematically in FIG. 2 for a corner vector. Other vectors may be similarly stacked into other cells of the parallelepiped 250 herein referred as the "cube" even though it should be remembered that the number of cells along each of the three directions may be different from the number of cells along the other two, with s×p×N being the total number of cells in the "cube." To form the cube, the function Map (e.g., Gather) may be deployed.

Some of the cells (or vertical stacks) of the cube 250 may be empty (e.g., filled with zeros). For example, the cells stacked above the coordinates (x,y) that correspond to empty spaces of the document image 210 may have all zeros. A row (along the x-direction) or a column (along the y-direction) may have all zeros for all its vectors if such a row or a column does not contain any characters (e.g., falls between the lines of the text). Even those rows/columns that contain characters may have some (or even most) of its cells filled with zeros. For example, if an j-th row contains ten words, and the horizontal dimension of the document image 210 is discretized into 32 cells, only 10 non-zero vectors vec(x,y) may be present in this row, interspaced with 22 null vectors. In some implementations, vectors(x,y) that do not have at least one non-zero component may be eliminated from the cube.

The cube 250 having s×p×N cells containing a set {vec (x,y)} of M identified vectors corresponding to identified symbol sequences may be input to the subsystem B 260 for vector recalculation {vec(x,y)}→{VEC(x,y)} in view of the global context of the whole document. The subsystem B 260 may have one or more neural networks (as explained below, in reference to FIG. 3A), which may modify the components of the vector representations vec(x,y) of the symbol sequences in view of all other vectors of the cube 250. As a result, the recalculated values VEC(x,y)=($Z_1, Z_2, \ldots Z_{2N}$) may account for the context of the entire document. More specifically, the recalculated values VEC(x,y)=($Z_1, Z_2, \ldots Z_{2N}$) output by the subsystem B 260 may account for the presence of all other symbol sequences in the document as well as the content of each of these symbol sequences.

The new cube 270 containing the set of the recalculated vectors {VEC(x,y)} may be input on the subsystem C 280 to predict a class of each symbol sequence identified in the document image 210. In some implementations, the field detection engine 111 can use the machine learning model(s) 114 to generate hypotheses about symbol sequences SymSeq 220 of the document (represented with the set of vectors {VEC(x,y)}) belonging to various classes of the fields in the input document 140, as described in more detail below in reference to FIG. 4. The classes of the field may be "vendor name," "type of merchandize," "quantity of merchandize," "order number," "type of shipment," "place of delivery," "date of the order," "payment type," and so on. In some implementations, various classes of the fields may be predetermined for at least some of the document types and input into the third subsystem 280 as a set of external parameters. In other implementations, various classes that may be present in the document may be determined by the third subsystem 280, which may be trained to ascertain the type of the input document (e.g., "invoice," "order," "bill," etc.) and anticipate the classes of the fields that may likely be present in the determined type of the input document.

Some of the components illustrated in FIG. 2 may be combined. For example, subsystems A, B, and C may be realized as a single neural network, in one implementation. In some implementations, subsystems A and B may be realized as a single network while subsystem C may be realized as by a separate network. Similarly, in some implementations, subsystems B and C may be realized as a single network while subsystem A may be realized as by a separate network. In those implementations where multiple subsystems are realized by a combined single network, the functions of different subsystems in the combined network may be implemented by separate dedicated layers or by shared layers, or by some combination thereof.

Figure 3A:
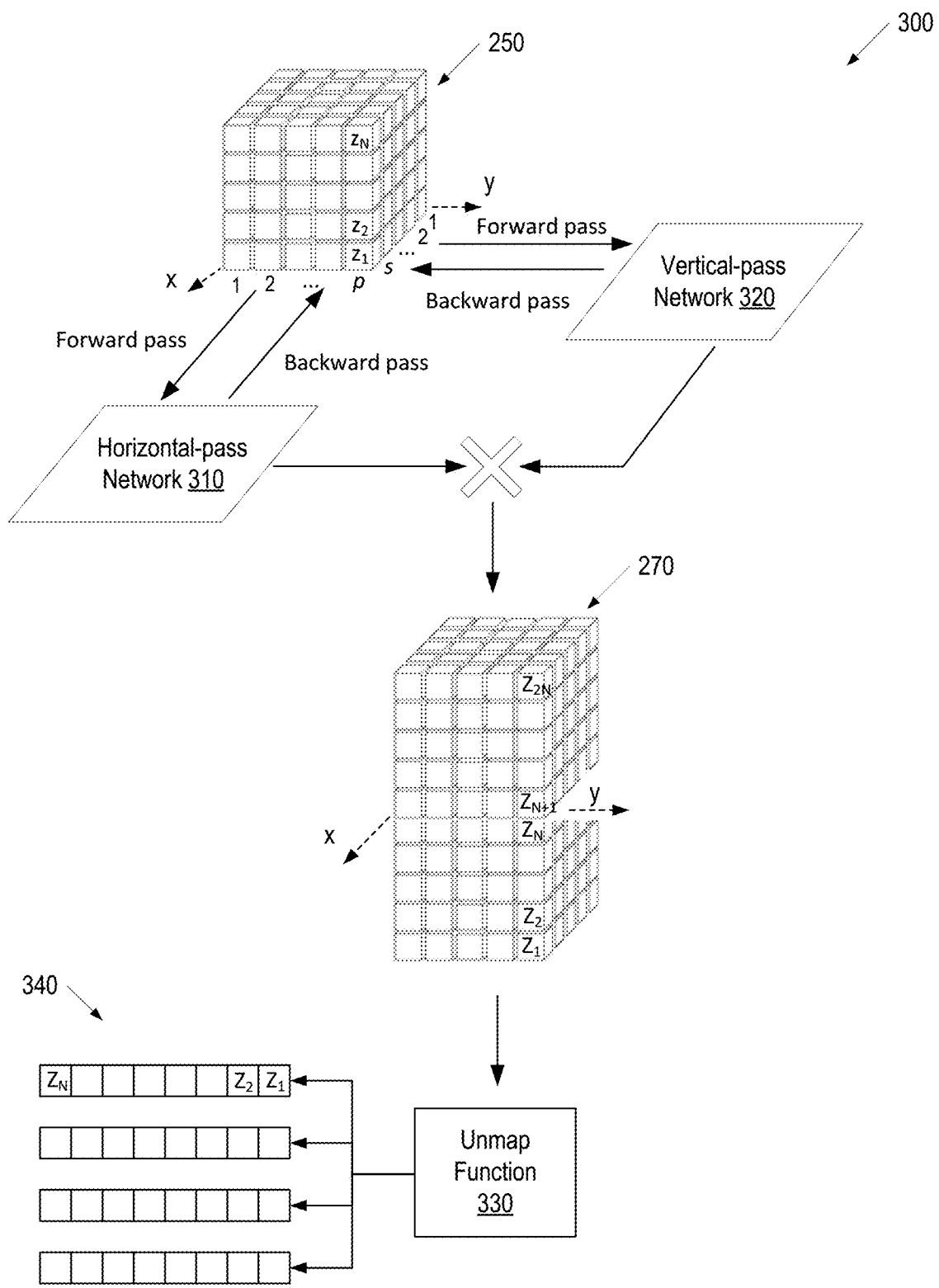
FIG. 3A is a schematic diagram illustrating an example neural network subsystem that recalculates the values of the vector representations of various symbol sequences of an input document based on the global document context, in accordance with some implementations of the present disclosure.

FIG. 3A is a schematic diagram illustrating an example neural network subsystem 300 that recalculates the values of the vector representations of various symbol sequences of an input document based on the global document context, in accordance with some implementations of the present disclosure. The neural network subsystem 300 may be the subsystem B 260, in one implementation. The neural network subsystem 300 may be implemented by the field detection engine 111.

The cube 250 containing a set {vec(x,y)} of vectors corresponding to identified symbol sequences SymSeq may be input into the subsystem 300. The subsystem 300 may include one or more neural networks each containing a plurality of layers of neurons. In some implementation, the subsystem 300 may include two neural networks, a horizontal-pass network 310 and a vertical-pass network 320. In some implementations, the horizontal-pass network 310 and the vertical-pass network 320 may be long short-term memory (LSTM) networks. In other implementations, the horizontal-pass network 310 and the vertical-pass network 320 may be RNNs or Attention-based LSTM networks.

The horizontal-pass network 310 and the vertical-pass network 320 may perform a plurality of passes along the horizontal (x) and vertical (y) dimensions of the cube 250. More specifically, the horizontal-pass network 310 may select, in consecutive iterations, each one of the s columns of the base (the bottom plane of cells) and the vertical-pass network 320 may similarly select each one of the p rows of the base. The null vectors (those that have all zeros) may be ignored, e.g. skipped over. The horizontal-pass network 310 and the vertical-pass network 320 may recalculate vector components, $vec(x,y)=(z_1, z_2, \ldots z_N) \rightarrow VEC(x,y) = (Z_1, Z_2, \ldots Z_N)$, for some or all of the vectors {vec(x,y)} so that the values $VEC(x,y)=(Z_1, Z_2, \ldots Z_N)$ are recalculated based on the values of all vectors {vec(x,y)} of the document and, therefore, the new values {VEC(x,y)} may depend on the context (type, content) of the entire document.

In one exemplary implementation, the vector recalculation may be performed as follows. The horizontal-pass network 310 may iteratively select consecutive values of columns j, such that $1 \leq j \leq s$. For each j, the horizontal-pass network 310 may identify a plane of vector components $z_1 (x_j,y_k), z_1 (x_j,y_k), \ldots z_N (x_j,y_k)$ located in the cell of the cube 250 having the same column index j but various possible row indices k. The horizontal-pass network 310 may then use parameters (e.g., weights and biases) of the network 310 to modify the values of the vector components $z_1 (x_j,y_k), z_1 (x_j,y_k), \ldots z_N (x_j,y_k)$ based on the values in the preceding plane, $z_1 (x_{j-1},y_k), z_1 (x_{j-1},y_k), \ldots z_N (x_{j-1},y_k)$, or a fixed number (two, three, ten, or any other number) of preceding planes. In some implementations, the values for the column plane j may be recalculated based on all preceding planes, having indices from 1 to j−1. After recalculation of the values of the vector components $z_1 (x_j,y_k), z_1 (x_j,y_k), \ldots z_N (x_j,y_k)$ for the column-plane j, the horizontal-pass network 310 may proceed with recalculating the values of the vector components for the next plane, $z_1 (x_{j+1},y_k), z_1 (x_{j+1},y_k), \ldots z_N (x_{j+1},y_k)$, and so on, until all columns of the cube 250 are recalculated.

The horizontal-pass network 310 may perform multiple horizontal passes as described above. In some implementations, some of the passes may be performed in the backward direction, e.g., starting with j=s and proceeding towards smaller values of j until the column j=1 is reached and recalculated.

The vertical-pass network 320 may likewise select, in consecutive iterations, each one of the p rows of the base plane of cells of the cube 250 and similarly recalculate the vector components based on the values of all vectors {vec(x,y)} of the document. For example, the vertical-pass network 320 may iteratively select consecutive values of rows k, such that $1 \leq k \leq p$. For each k, the vertical-pass network 320 may identify a plane of vector components $z_1 (x_j,y_k), z_1 (x_j,y_k), \ldots z_N (x_j,y_k)$ located in the cell of the cube 250 having the same row index k but various possible column indices j. The vertical-pass network 320 may then use parameters (e.g., weights and biases) of the network 320 to modify the values of the vector components $z_1 (x_j,y_k), z_1 (x_j,y_k), \ldots z_N (x_j,y_k)$ based on the values in the preceding plane, $z_1 (x_j,y_{k-1}), z_1 (x_j,y_{k-1}), \ldots z_N (x_j,y_{k-1})$, or a fixed number (two, three, ten, or any other number) of preceding planes. In some implementations, the values for the row-plane k may be recalculated based on all preceding row-planes, having indices from 1 to k−1. After recalculation of the values of the vector components $z_1 (x_j,y_k), z_1 (x_j,y_k), \ldots z_N (x_j,y_k)$ for the row-plane k, the horizontal-pass network 310 may proceed with recalculating the values of the vector components for the next plane, $z_1 (x_j,y_{k-1}), z_1 (x_j,y_{k+1}), \ldots z_N (x_j,y_{k+1}), \ldots z_N (x_j,y_{k+1})$, and so on, until all rows of the cube 250 are recalculated.

The parameters of the horizontal-pass network 310 may be different from the parameters of the vertical-pass network 320. The parameters of the two networks may be determined during a training phase by selecting one or more training inputs 122, determining the output of the combined network (subsystem 300), comparing the output with training outputs 124 and backpropagating errors through the layers of networks on the horizontal-pass network 310 and the vertical-pass network 320.

During the training phase, the horizontal-pass network 310 and the vertical-pass network 320 may perform a plurality of passes until the error of the output of the subsystem 300 falls below some pre-determined error. The passes by the horizontal-pass network 310 and the vertical-pass network 320 may be performed in a variety of orders. For example, in one implementation, the first pass may be a forward pass by the horizontal-pass network 310, the second path may be a backward path by the horizontal-pass network 310, the third pass may be a forward path by the vertical-pass network 320, the fourth pass may be a backward path by the vertical-pass network 320, and so on. This process may be repeated a number of times. Alternatively, in another implementation, the first pass may be a forward pass by the horizontal-pass network 310, the second path may be a forward path by the vertical-pass network 320, the third pass may be a backward path by the horizontal-pass network 310, the fourth pass may be a backward path by the vertical-pass network 320, and so on. In another implementation, each of the two networks may perform multiple (e.g., two, three, or more) passes in the same direction (forward or backward), before the same network may perform multiple passes in the opposite direction, or before the other networks performs multiple passes (in either direction). A person skilled in the technology will appreciate that it is possible to realize a virtually unlimited number of various combinations of the two networks performing passes in the two directions.

The result of the training phase may be a set of parameters (e.g., biases and weights) for the horizontal-pass network 310 and a set of parameters for the vertical-pass network 320. The two sets may be different. Furthermore, each of the two networks may have a set of parameters that is different for forward and backward passes. Additionally, while in some implementations the parameters (e.g., for backward passes of the horizontal-pass network 310) may be independent of where the recalculated column-plane is located, in other implementations, the parameters may depend on such locations. For example, the parameters may be different for column-planes (row-planes) located near the edges of the document from the planes located near the middle of the document.

The output of the horizontal-pass network 310 and the output of the vertical-pass network 320 may be concatenated to produce a recalculated cube 270. (The concatenation operation is depicted on FIG. 3A with a white cross.) The concatenated vectors may have recalculated values VEC(x, y)=($Z_1, Z_2, \ldots Z_N, Z_{N+1}, \ldots Z_{2N}$), having first N components that represent the output of the horizontal-pass network 310 and the last N components that represent the output of the vertical-pass network 320 (or vice versa). For example, if the original vectors vec(x,y) that form the (input) cube 250 have 128 components, the recalculated vectors VEC(x,y) that form the (output) cube 270 may have 256 components, in one exemplary implementation.

In the prediction phase, the subsystem 300 may operate in the same order of combinations as in the training phase, in one implementation. In other implementations, the number of passes in the prediction phase may be less (or greater) than in the training phase. For example, if the number of documents to be analyzed is significant, the number of passes (per document) in the prediction phase may be significantly reduced compared with the training phase.

During the prediction phase, upon the completion of a predetermined number of passes (the number of passes may be predetermined during training phase, as the number sufficient to achieve a required accuracy), the subsystem 300 may output the cube 270 having the recalculated values of the vector components VEC(x,y)=($Z_1, Z_2, \ldots Z_N, Z_{N+1}, \ldots Z_{2N}$), An Unmap (e.g. Scatter) function 330 may unmap the recalculated cube 270 into a set of recalculated unmapped vectors 340 having the original length (N components). For example, in some implementations, the Unmap function 330 may combine two components of the vector ($Z_1, Z_2, \ldots Z_N, Z_{N+1}, \ldots Z_{2N}$), e.g., according to $Z_k + Z_{N+k} \rightarrow Z_k$, or according to some other mapping scheme that reduces the number of vector components from 2N to N. In other implementations, the Unmap function 330 may first eliminate zero components of the vector ($Z_1, Z_2, \ldots Z_N, Z_{N+1}, \ldots Z_{2N}$) and select the first N (the last N, the largest N, etc.) remaining components. In another implementation, a dense neural network layer having 2N inputs and N outputs may reduce the vector VEC(x,y)=($Z_1, Z_2, \ldots Z_N, Z_{N+1}, \ldots Z_{2N}$) into a reduced vector VEC(x,y)= ($Z_1, Z_2, \ldots Z_N$). The reduced (unmapped) vectors 340 may include the coordinate of the corresponding symbol sequences SymSeq. In some implementations, the reduction of the length of each of the vectors from 2N to N may involve just that one vector; namely, determination of the components of the reduced vector identified by coordinates (x,y) may not involve components of other vectors (e.g., identified by different coordinates). Because the unmapped vectors 340 output by the subsystem 300 are recalculated based on values of all vectors of the document, the unmapped vectors 340 depend on the context of the entire document.

Figure 3B:
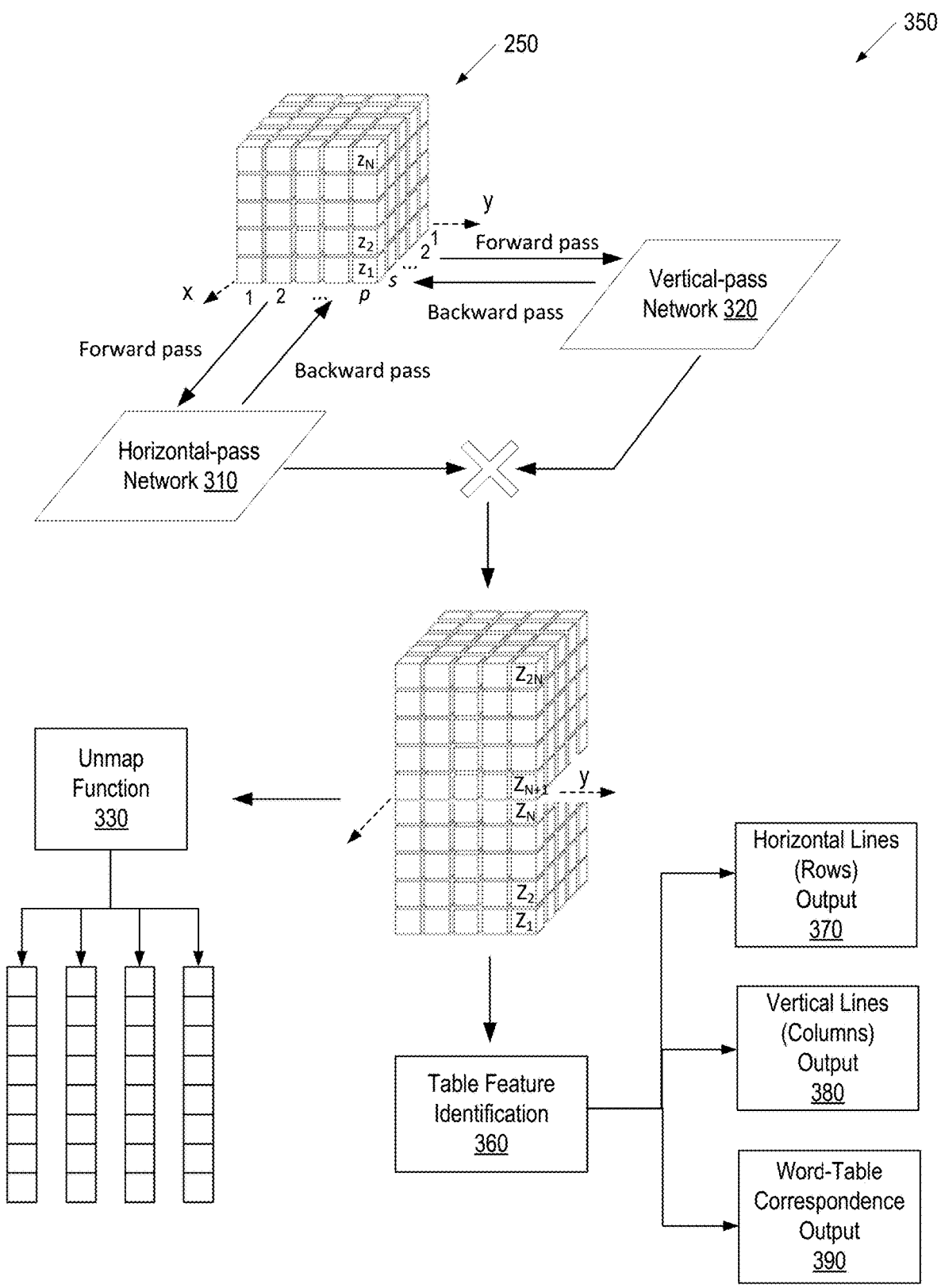
FIG. 3B is a schematic diagram illustrating an example implementation of the neural network subsystem of FIG. 3A capable of identification of table features of an input document based on the global document context, in accordance with some implementations of the present disclosure.

FIG. 3B is a schematic diagram illustrating an example implementation 350 of the neural network subsystem 300 of FIG. 3A capable of identification of table features of an input document based on the global document context, in accordance with some implementations of the present disclosure. The neural network subsystem 350 may be the subsystem B 240, in one implementation. The neural network subsystem 350 may be implemented by the field detection engine 111.

The neural network subsystem 350 may operate similarly to the neural network subsystem 300 but may have additional (supplementary) output for table detection, such as a table feature identification 360. The neural network subsystem 350 may have the horizontal-pass network 310 and the vertical-pass network 320 which may perform a plurality of horizontal and vertical passes in the forward and backward directions, as described above in reference to FIG. 3A. At each pass, in consecutive iterations, the horizontal-pass network 310 and the vertical-pass network 320 may recalculate vectors vec(x,y)=($z_1, z_2, \ldots z_N$). Among those vectors may be both vectors corresponding to alphanumeric characters and vectors corresponding to lines of tables. The recalculated vectors VEC(x,y)=($Z_1, Z_2, \ldots Z_N$) are based on the values of all vectors of the document—both describing alphanumeric sequences and lines of tables—and, therefore, the new set of vectors {VEC(x,y)} may depend on the context (type, content) of the entire document, including relative positioning of alphanumeric sequences and lines and partitions of tables.

The table feature identification 360 may include a horizontal lines output 370, which may be used for identification of rows of tables. The table feature identification 360 may also include a vertical lines output 380, which may be used for identification of columns of tables. The horizontal lines output 370 and the vertical lines output 380 may determine the extent of rows and columns, respectively, and may further distinguish rows, columns, and cells of multiple tables that may be present in the document. More specifically, the horizontal lines output 370 and the vertical lines output 380 may determine whether a given line is a left/right or top/bottom line of a table. The table feature identification 360 may further include a word-table correspondence output 390, which may contain information about belonging of a specific alphanumeric sequence to a particular table row, column, or cell.

Figure 4:
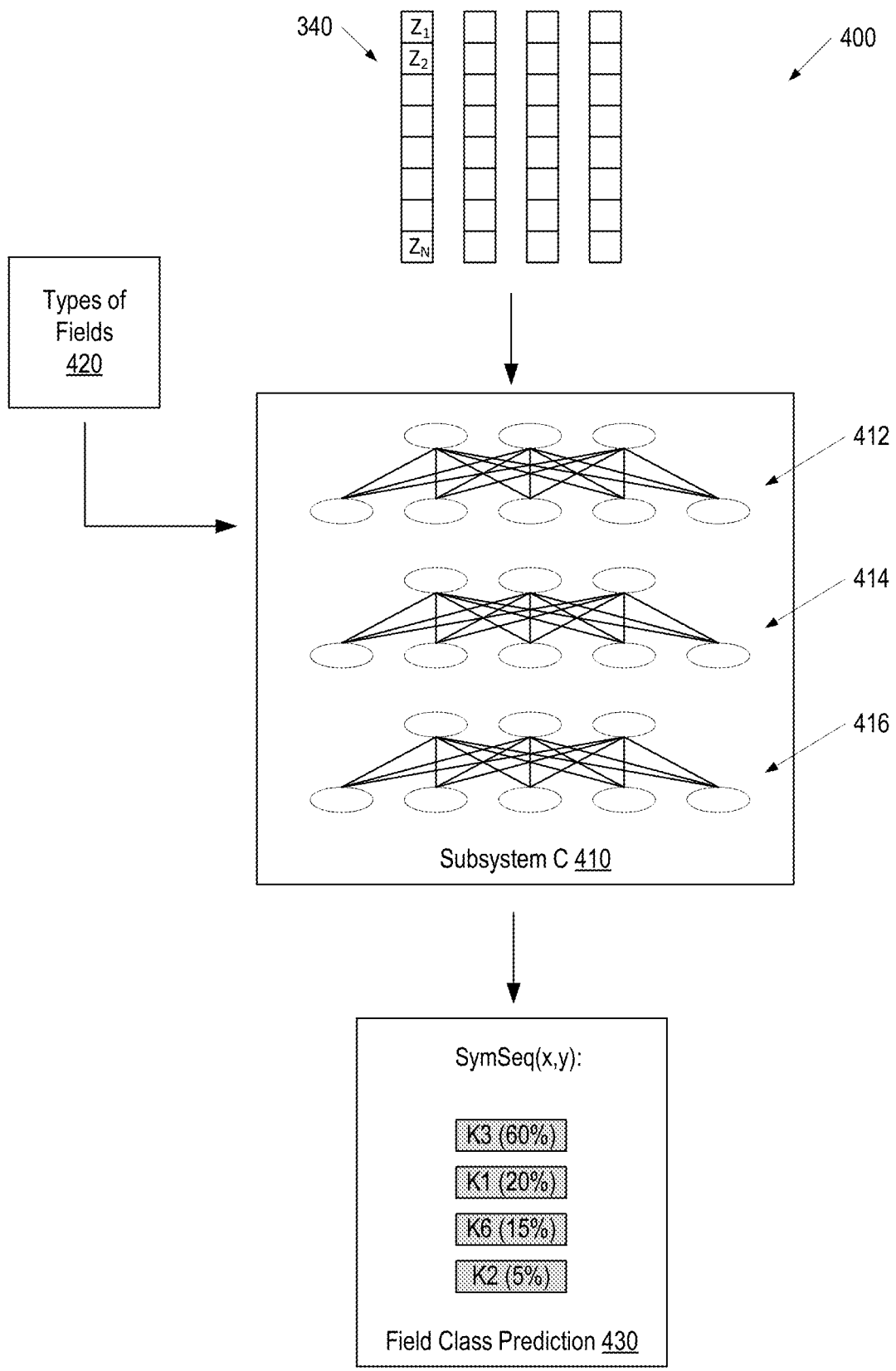
FIG. 4 is a schematic diagram illustrating operations of an example neural network subsystem that predicts a class of the field populated with a particular symbol sequence identified in the document image, in accordance with some implementations of the present disclosure.

FIG. 4 is a schematic diagram illustrating operations 400 of an example neural network subsystem 410 that predicts a class of the field populated with a particular symbol sequence identified in the document image, in accordance with some implementations of the present disclosure. The neural network subsystem 410 illustrated in FIG. 4 may be the subsystem C 280, in one implementation. The neural network subsystem 410 may be implemented by the field detection engine 111. The neural network subsystem 410 may use, as input, the output of the subsystem B (e.g., subsystem 300 or subsystem 350). More specifically, the neural network subsystem C 410 may input the recalculated values of the vector components VEC(x,y)=($Z_1, Z_2, \ldots Z_N$) corresponding to the identified symbol sequences SymSeq (x,y). The subsystem C 410 may have one or more fully-connected/dense neuron layers, e.g., layers 412, 414, 416. Some of the fully connected layers may use a softmax function. One or more fully-connected layers 412, 414, and/or 416 may be connected to each other by layers that are not fully-connected, in some implementations.

In some implementations, the subsystem 410 may use additional field type input 420 that may include listings of field for various types of documents. For example, in some implementations, the type of field input 420 may contain information that an invoice document may include such fields as "seller," "buyer," "seller's address," "buyer's address," "type of goods," "quantity of goods," "method of payment," "deposit amount," "delivery date," "delivery date," "signature," and so on. In some implementations, the field type input may be provided as part of the training input(s) 122 and training output(s) 124 and the subsystem 410 may determine the number and type of fields encountered in various types of documents as part of the training process (phase).

The subsystem C 410 may classify each of the symbol sequences SymSec(x,y) into one of a plurality of predefined classes. Each of the predefined classes may correspond to one of the field types to be detected. In order to classify symbol sequences, the subsystem C 410 may generate hypotheses that some or each of the identified symbol sequences—described by the corresponding vectors 340—belong to one of the fields of the document. The subsystem C 410 may further determine probabilities of a specific symbol sequence belonging to various types of fields in the document (determined during the training phase or explicitly input). The field class prediction output 430 of the subsystem C 410 may include an association for each of the symbol sequences SymSeq(x,y) with various classes K1, K2, K3, K4, . . . For example, as indicated in FIG. 4, the associations may be by means of assigning various probabilities for the sequences SymSeq(x,y) to belong to the corresponding types of fields to be detected. For example, the subsystem C 410 may determine that a particular sequence SymSeq(x,y) may belong to class K3 with 60% probability, to class K1 with 20% probability, to class K6 with 15% probability, and to class K2 with 5% probability.

To determine the field class predictions 430 for various symbol sequences of the document, the subsystem C 410 may first generate a plurality of hypotheses that each of the identified SymSeq(x,y) may belong to a given class Kn. For example, a hypothesis may be that a set of several words that are located in the vicinity of each other (e.g., in the same line) may belong to the same field (e.g., vendor's address). Another hypothesis may be that some of the same words may belong to a buyer's address. A hypothesis for a word may be generated based on one or more features of the word (or sentence) that is known with certainty, such as a location of the word, a number of characters in the word, etc. A hypotheses generator implemented by the subsystem C 410 and/or the field detection engine 111 may generate multiple hypothesis for each SymSeq(x,y) based on the known features of this sequence.

A set of generated hypotheses may then be input into one or more neural networks of the subsystem C 410 to evaluate/test the generated hypotheses and to assign probability values to each generated hypothesis. A testing function may be used for hypotheses testing. The testing function may be determined based on evaluation of training inputs 122, comparison of the actual outputs of the subsystem C 410 with the training outputs 124 and adjustment of parameters of the testing function in such a way as to minimize the difference between the actual outputs of the subsystem 410 and the training outputs 124. Training of the testing function may be performed by using gradient boosting techniques, decision tree methods, or similar methods.

Next, the subsystem C 410 may form and test chains (sets) of hypotheses. For example, the subsystem C 410 may have determined that symbol sequence Word-1 with 95% probability belongs to field F1 and that Word-2 belongs to field F2 with 60% probability and to field A with 30% probability. Rather than deciding that Word-2 has to be associated with field B (according to the higher probability), the subsystem C 410 may analyze two chains of hypothesis: 1) Word-1 belongs to class K1 and Word 2 belongs to class K2, and 2) both Word-1 and Word-2 belong to class K1. The subsystem 410 may then determine that Word-1 and Word-2 should have a higher probability to belong to the same field than to different fields and, consequently, the hypothesis 2) should be a preferred hypothesis despite the individual determination of Word-2 favoring its belonging to class K1. In another example, a chain of hypothesis that leaves some fields empty may be disfavored compared with a chain that assigns at least one word to each of the fields.

Generation and testing of hypotheses for table identification may be performed in a similar way to generation and testing of word hypotheses. The horizontal lines output 370 may be used to generate hypotheses related to locations of rows of tables in the document. The vertical lines output 380 may be used to generate hypotheses related to locations of columns of tables in the document. The word-table correspondence output 390 may be used to generate hypotheses related to belonging of various alphanumeric sequences to various table partitions—rows, columns, and cells. For example, during hypotheses generation, a plurality of hypotheses may be generated about locations of alphanumeric sequences (e.g., words) relative to various horizontal and vertical lines, about association of words to cells of tables, etc. During testing of hypotheses, the neural network (e.g., subsystem C 410) determines probabilities for various hypotheses, chains of hypotheses, and analyses conflicts between hypotheses (and/or chains of hypotheses). As a result, the most probable hypotheses are selected, which may associate table partitions with alphanumeric sentences associated with (e.g., belonging to) these partitions. The evaluation of hypotheses (determination of probabilities) may be performed with heuristic methods, decision tree methods, gradient boosting methods, and so on. Classification of types of table partitions may be performed with the help of a function trained to evaluate features (vectors) of words belonging to various table partitions in training inputs 122.

After selection of the most probable hypotheses and/or chains of hypotheses, the symbol sequences SymSeq(x,y) may be classified according to the hypotheses (chains of hypotheses) which are determined to have the highest probabilities. A set of symbol sequences may be associated with each field of the document and/or partition of the table(s) present in the document. Each field/table partition may have one or more symbol sequences (e.g., single alphanumeric characters, single words, multiple words, sentences, etc.). Some fields/table partitions may have no identified symbols. The content of the identified fields/table partitions of the document may be stored, e.g., in repository 120, or any other storage device, including a local or a network (e.g., cloud) storage device. The content of the identified fields/table partitions may be stored as part of a profile of the document. The profile of the document may be stored in a dedicated file or folder associated with a recipient of the document, in one implementation. In other implementations, the profile of the document may be stored as part of a file or folder associated with an issuer of the document, with the type of the document, the time of issuance of the document, and the like.

In one implementation, after the fields/table partitions in the document are identified, the information about the identified fields/table partitions may be stored, e.g., in repository 120, or any other storage device, including a local or a network (e.g., cloud) storage device. The fields/table partitions may be identified by their absolute locations (e.g., coordinates) or relative locations (with respect to other fields/partitions). This information may be reused when a subsequent document of the same or similar type is input for identification of its field. In such instances, after OCR of the subsequent document, the fields/table partitions may be populated (and stored in a profile of the subsequent document) with the symbol sequences for the already determined fields/table partitions based on the coordinates (x,y) of the symbol sequences in the subsequent document. In such instances, the neural networks may not have to be used for detection of fields/table partitions in subsequent documents.

In other implementations, where it may be expected that a subsequent document (or form) may be of a different edition or layout, the fields/table partitions (and their locations) identified for the original document may be used during field identification of the subsequent document as hypotheses. Such hypotheses may be tested together with other hypotheses that may be generated by the neural networks, as described above. A new layout of fields/table partitions detected in each additional document may be similarly added to the pool of hypotheses for field/table detection in future documents.

In one exemplary implementation, after a subsequent document is obtained, and a particular symbol sequence of the subsequent document is identified, it may be determined that the symbol sequence of the subsequent document has a location in the subsequent document that coincides, within a pre-determined accuracy, with the location of the first text field or with the first table partition in one of the earlier processed documents. It may then be determined that the symbol sequence of the subsequent document is associated with the first text field or with the first table partition.

In some implementations, the location of a text field or a table partition may be determined based on a placement of the alphanumeric sequence relative to at least one other symbol sequence of the plurality of symbol sequences. For example, placement of the alphanumeric sequence "tendered" may be defined relative to the location of another sequence "total amount."

Figure 5:
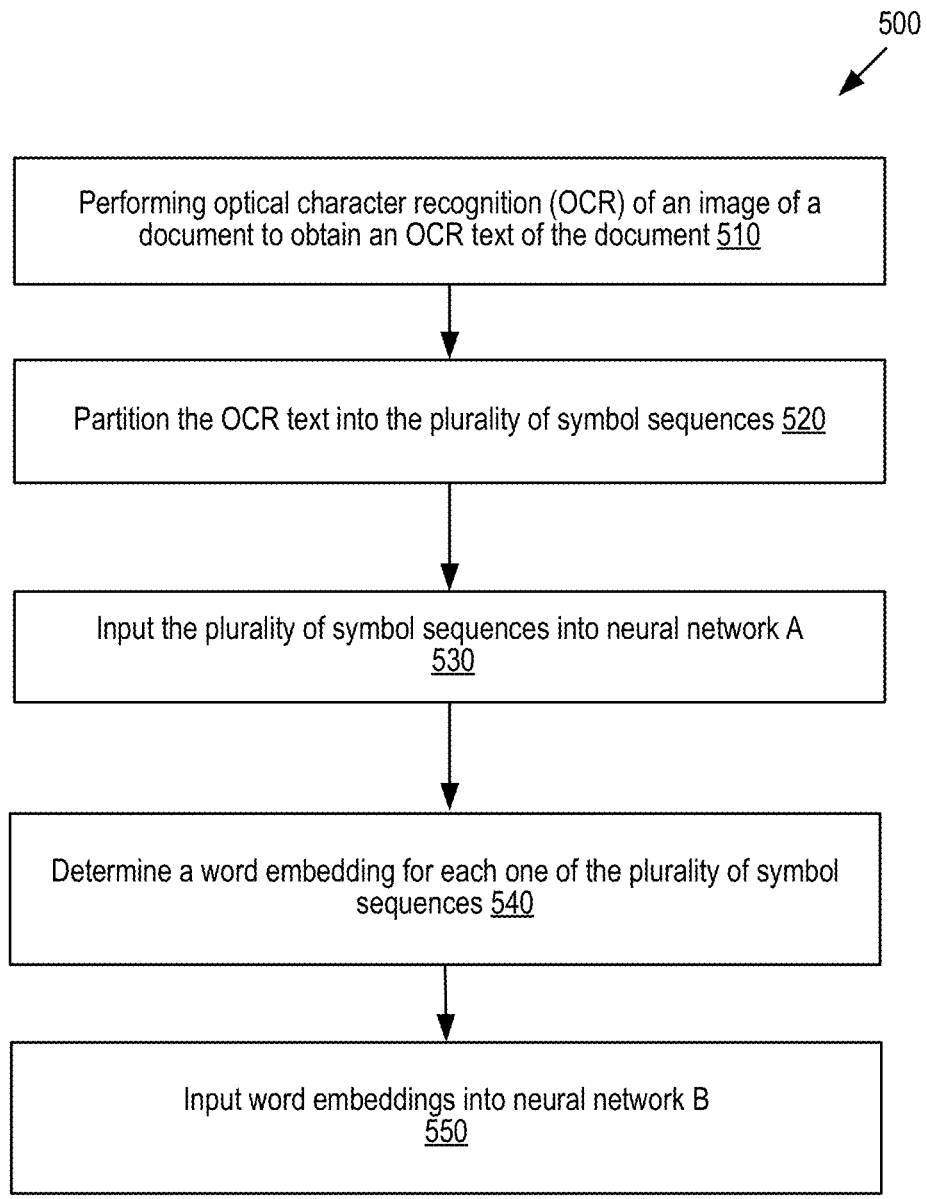
FIG. 5 is flow diagram illustrating one exemplary method that uses neural networks to determine vector representations (e.g., word embeddings) for symbol sequences identified in an image of a document, in accordance with some implementations of the present disclosure.
Figure 6:
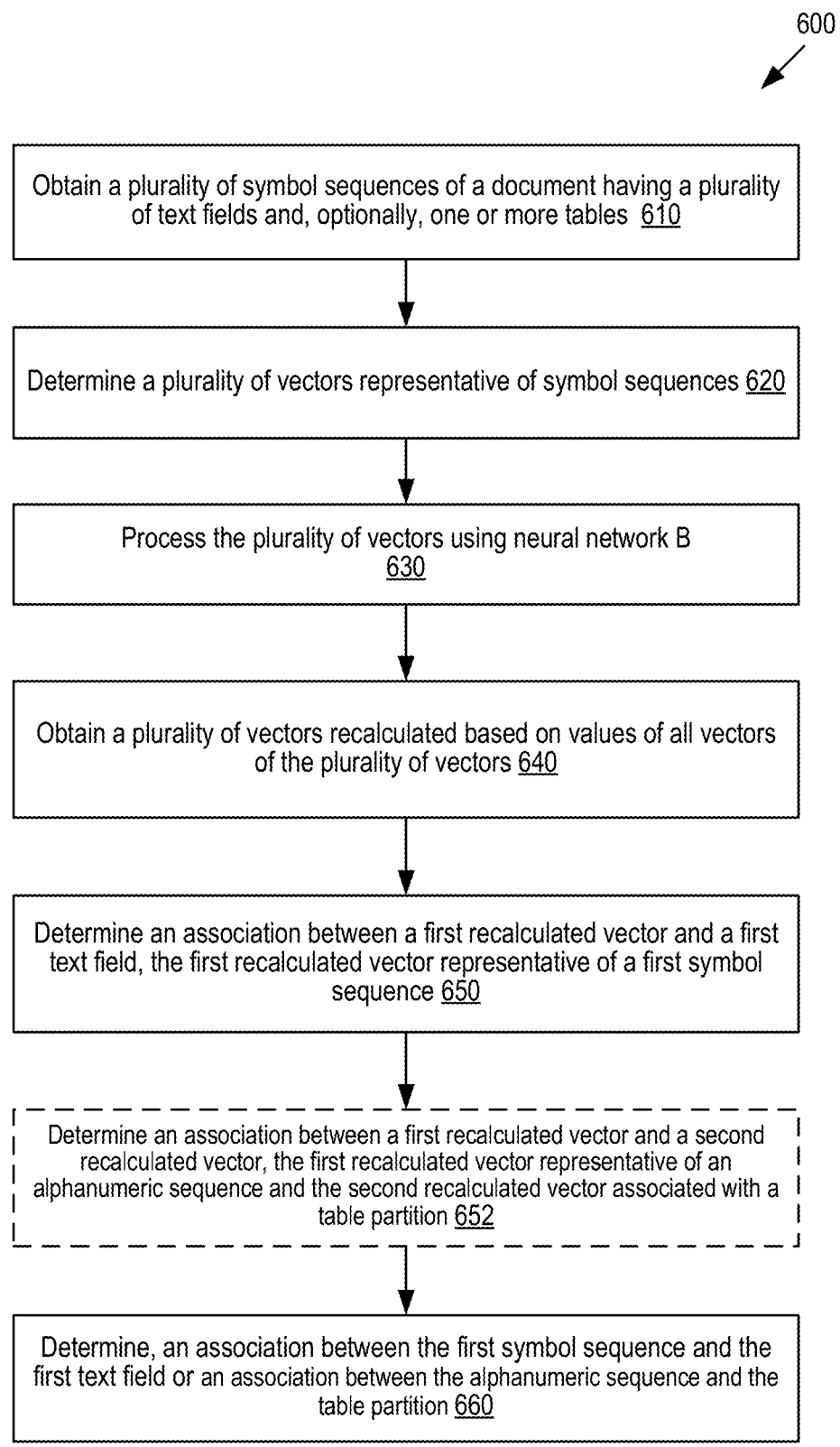
FIG. 6 is flow diagram illustrating one exemplary method that uses neural networks to determine associations between symbol sequences and fields/tables of a document using the global document context, in accordance with some implementations of the present disclosure.
Figure 7:
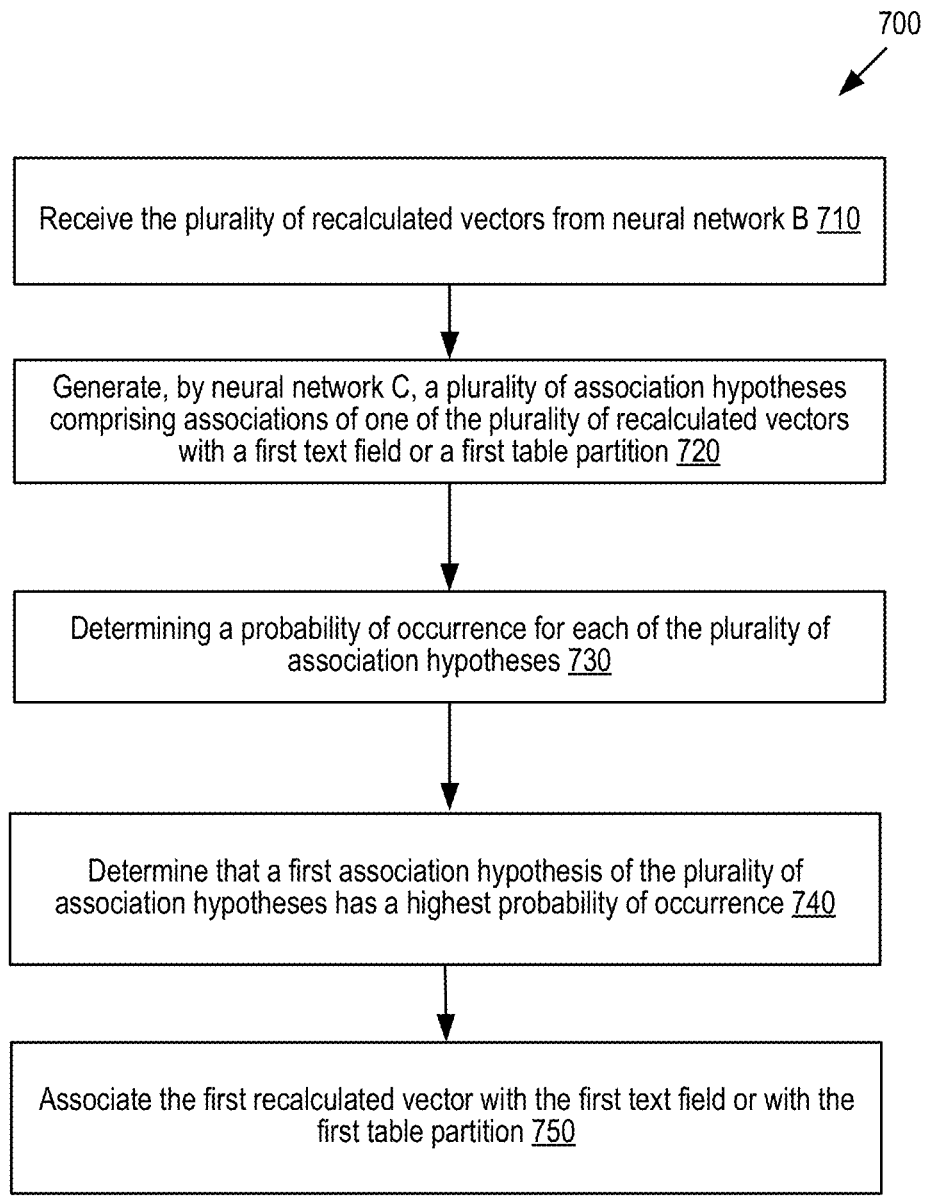
FIG. 7 is flow diagram illustrating one exemplary method that uses neural networks to generate and test a plurality of hypotheses of associations between symbol sequences and fields/tables of a document, in accordance with some implementations of the present disclosure.

FIGS. 5, 6 and 7 are flow diagrams illustrating exemplary methods 500, 600 and 700 that use neural networks to account for the global document context in identification of fields and tables, in accordance with some implementations of the present disclosure. Each of methods 500, 600, and 700 may be performed by processing logic that may comprise hardware (e.g., circuitry, dedicated logic, programmable logic, microcode, etc.), software (such as instructions run on a processing device), firmware, or a combination thereof. In one implementation, methods 500, 600, and 700 may be performed by a processing device (e.g. a processing device 802 of FIG. 8) of a computing device 110 and/or a server machine 150 as described in connection with FIG. 1. In certain implementations, methods 500, 600, and 700 may be performed by a single processing thread. Alternatively, methods 500, 600, and 700 may be performed by two or more processing threads, each thread executing one or more individual functions, routines, subroutines, or operations of the method. In an illustrative example, the processing threads implementing methods 500, 600, and 700 may be synchronized (e.g., using semaphores, critical sections, and/or other thread synchronization mechanisms). Alternatively, the processing threads implementing methods 500, 600, and 700 may be executed asynchronously with respect to each other. Therefore, while FIGS. 5, 6, and 7 and the associated descriptions list the operations of methods 500, 600, and 700 in certain order, various implementations of the methods may perform at least some of the described operations in parallel and/or in arbitrary selected orders.

FIG. 5 is flow diagram illustrating one exemplary method 500 that uses neural networks to determine vector representations (e.g., word embeddings) for symbol sequences identified in an image of a document, in accordance with some implementations of the present disclosure. At block 510, the processing device (e.g., a computer) implementing method 500 may perform optical character recognition (OCR) of an image of a document to obtain an OCR text of the document 510. In some implementations, the document may have a plurality of text fields populated with alphanumeric symbol sequences. In some implementations, the document may also have at least one table having a plurality of partitions, such as cells, rows, and/or columns.

At block 520, the processing device performing method 500 may partition the OCR text into the plurality of symbol sequences SymSeq(x,y) of the document. Symbol sequences may be alphanumeric, graphic, or combined. Alphanumeric sequences may represent text (syllables, words, sentences), numbers, glyphs, and so on. Graphic sequences may represent table graphics elements, such as a horizontal line, a vertical line, an oblique line, a corner (a two-way line intersection that may be indicative of a corner table partition), a three-way line intersection (that may be indicative of an edge table partition), or a four-way line intersection (that may be indicative of an inside table partition). A combined sequence may be a combination of one or more alphanumeric symbols and one or more table graphics elements. A sequence may have a plurality of symbols, but may be a single symbol, in some instances.

At block 530, the processing device performing method 500 may input the plurality of symbol sequences into neural network A. The neural network A may be the subsystem A (240) described in relation to FIG. 2. The purpose of the neural network A may be to determine a plurality of vectors representative of the symbol sequences determined at block 520. In particular, at block 540, the neural network A may determine a word embedding for each one of the plurality of symbol sequences. The word embeddings may be vectors $vec(x,y)=(Z_1, Z_2, \ldots Z_N)$ corresponding to the identified symbol sequences SymSeq(x,y), as described above in relation to FIG. 2. The neural network A may be previously trained on input documents, which may be of a similar type to the target document.

The determined vectors (e.g., word embeddings) $vec(x,y)=(Z_1, Z_2, \ldots Z_N)$ may be input into the neural network B (550). The neural network B may be the subsystem B (260) described in relation to FIG. 2. The purpose of the neural network B may be to recalculate vectors $\{vec(x,y)\} \rightarrow \{VEC(x,y)\}$ taking into account a global context of the entire document.

FIG. 6 is flow diagram illustrating one exemplary method 600 that uses neural networks to determine associations between symbol sequences and fields/tables of an document using the global document context, in accordance with some implementations of the present disclosure. At block 610, a processing device performing method 600 may obtain a plurality of symbol sequences of a document having a plurality of text fields and, optionally, one or more tables. In one implementation, operations performed at block 610 may be similar to operations performed at blocks 510 and 520 of method 500. At block 620, the processing device may determine a plurality of vectors vec(x,y) representative of symbol sequences. In one implementation, operations performed at block 610 may be similar to operations performed at blocks 530 and 540 of method 500.

At block 630 the method 600 may continue with processing the plurality of vectors $\{vec(x,y)\}$ using neural network B. The output of the neural network B may be a plurality of vectors, $\{vec(x,y)\} \rightarrow \{VEC(x,y)\}$, recalculated based on values of all or some of the vectors of the plurality of vectors (640). To obtain the plurality of recalculated vectors, the processing device performing method 600 may use a horizontal-pass network 310 and/or a vertical-pass network 320, as described in connection with FIGS. 3A-B. The outputs of the networks 310 and 320 may be concatenated and the set of recalculated vectors $\{VEC(x,y)\}$ may be determined from the concatenated results, as described above.

At block 650, the method may continue with determining an association between a first recalculated vector and a first text field, the first recalculated vector being representative of a first symbol sequence. For example, a text field "Total" may be associated with a recalculated vector that corresponds to an amount listed in an invoice document. An optional block 652 may be performed in those instances where the document contains at least one table. Specifically, at block 652, the processing device performing method 600 may determine an association between a first recalculated vector and a second recalculated vector, the first recalculated vector representative of an alphanumeric sequence and the second recalculated vector associated with a table partition, such as a cell, a row, or a column. In some implementations, the first recalculated vector of block 652 may be the same as the first recalculated vector of block 650. For example, the first recalculated vector representative of the amount (alphanumeric sequence) and associated with the field "Total" at block 650 may also be determined, at block 652, to be associated with a table partition (e.g., the last row or cell of the table) represented by the second recalculated vector. In some implementations, however, the first recalculated vector of block 652 may be different from the first recalculated vector of block 650. At block 660, method 600 may continue with determining an association between the first symbol sequence and the first text field or (when at least one table is present) an association between the alphanumeric sequence and the table partition.

FIG. 7 is flow diagram illustrating method 700 that uses neural networks to generate and test a plurality of hypotheses of associations between symbol sequences and fields/tables of a document, in accordance with some implementations of the present disclosure. In some implementations, the method 700 may implement blocks 650, 652, and 660 of the method 600. For example, at block 710 the method 700 may receive the plurality of recalculated vectors {VEC(x, y)} from the neural network B. At block 720, the processing device performing method 700 may generate, by a neural network C, a plurality of association hypotheses comprising associations of one of the plurality of recalculated vectors with a first text field or with a table partition. In some implementations, the neural network C may be the subsystem C (410) of FIG. 4. For example, a hypothesis may be that an n-th vector representing the alphanumeric sequence "$128" is associated with a field "amount tendered" that is known to be present (or may be present, with some probability) in the document. As another illustrative example, a hypothesis may be that an m-th vector representing the alphanumeric sequence "total" is associated with the rightmost cell in the first row of a table that may be present in the document.

At block 730, the method may continue with determining a probability of occurrence for each of the plurality of association hypotheses. This may be performed using one or more neural layers of the network C by utilizing a testing function, in one implementation. The testing function may be determined based on evaluation of training inputs (e.g., training inputs 122) and comparing the outputs of the network C with the training outputs 124 and tuning parameters of the testing function to minimize the difference between the current outputs and the training outputs.

At block 740, it may be determined that a first association hypothesis of the plurality of association hypotheses has a highest probability of occurrence. For example, the first association hypothesis may include an association of the first recalculated vector with the second recalculated vector. The highest probability may refer to an association of a given symbol sequence with a particular field or with a particular table partition, in one possible implementation. In other words, the hypotheses may be grouped by symbol sequences (e.g., all possible hypotheses of association of the symbol sequence "$128" with various fields may be grouped together). Accordingly, within a given group, a plurality of hypotheses of possible associations of a specific symbol sequence with various fields/table partitions may be analyzed and the highest probability hypothesis may be selected. In another possible implementation, the hypotheses may be grouped by fields or by table partitions. For example, all possible hypotheses of association a table cell (2,4)—e.g., a cell in the fourth column of the second row—with various alphanumeric sequences may be grouped together and the highest probability hypothesis of association of the cell (2,4) may be selected.

Figure 8:
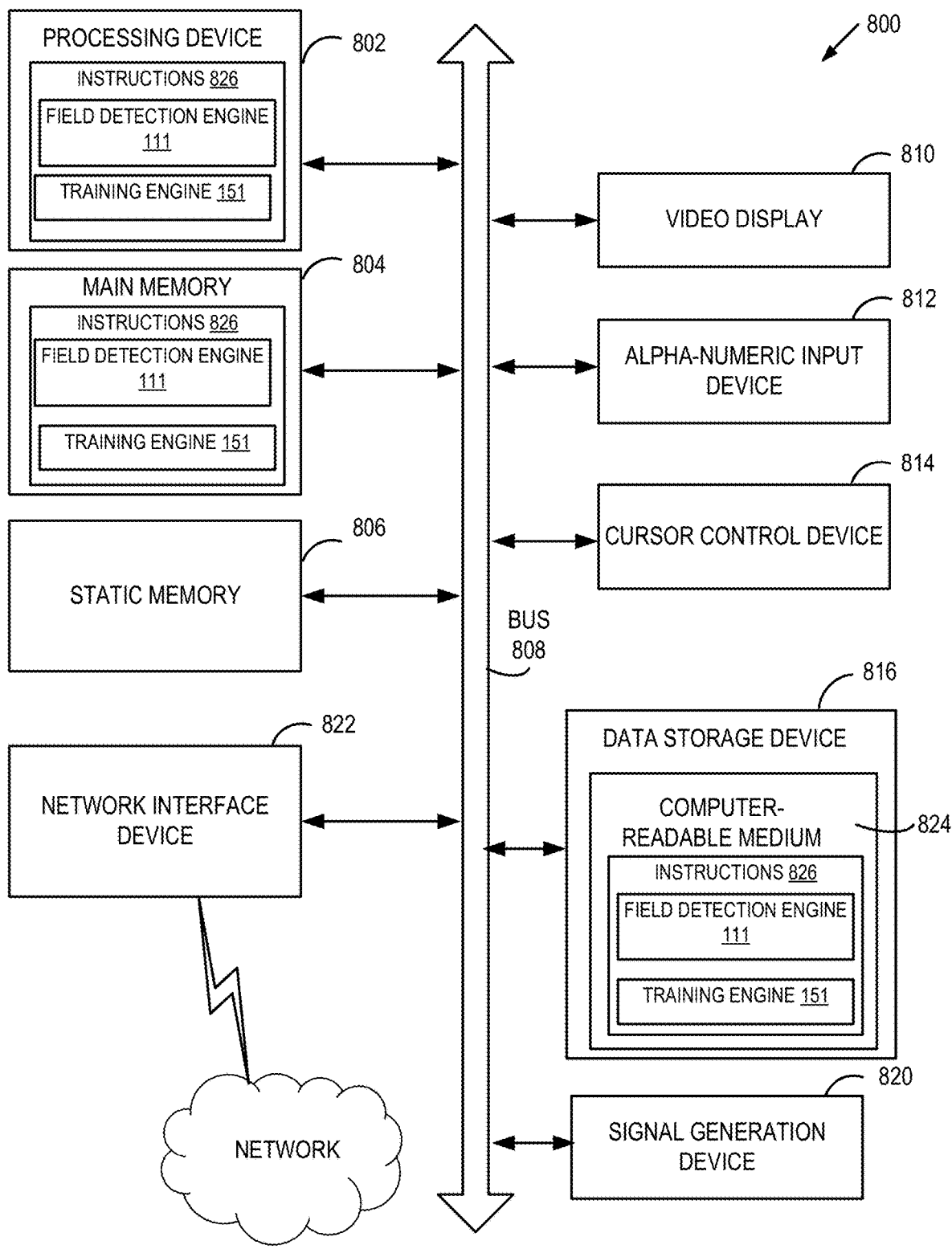
FIG. 8 illustrates a block diagram of a computer system in accordance with some implementations of the present disclosure.

At block 750, the method 700 may continue with the processing device selecting the highest probability hypothesis and associating the first recalculated vector with the first text field or with the first table partition FIG. 8 depicts an example computer system 800 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for implementing the field detection engine 111 and/or the training engine 151 of FIG. 1 and to perform the operations and steps discussed herein (e.g., methods 600-700 of FIGS. 6-7).

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a computer-readable medium 824 on which is stored the instructions 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting computer-readable media. In some implementations, the instructions 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
    obtaining a plurality of symbol sequences of a document, the document having at least one table, wherein each symbol sequence comprises at least one of an alphanumeric character or a table graphics element;
    determining a plurality of vectors, wherein a vector of the plurality of vectors is representative of one of the plurality of symbol sequences;
    processing, by a processing device, the plurality of vectors using a first neural network to obtain a plurality of recalculated vectors, wherein each of the plurality of recalculated vectors is recalculated based on values of the plurality of vectors;
    determining, by the processing device, an association between a first recalculated vector of the plurality of recalculated vectors and a second recalculated vector of the plurality of recalculated vectors, wherein the first recalculated vector is representative of an alphanumeric sequence and the second recalculated vector is associated with a table partition; and
    determining, based on the association between the first recalculated vector and the second recalculated vector, an association between the alphanumeric sequence and the table partition.

2. The method of claim 1, wherein obtaining the plurality of symbol sequences of the document comprises:
    performing optical character recognition (OCR) of an image of the document to obtain an OCR text of the document and a plurality of table graphics elements; and
    partitioning the OCR text and the plurality of table graphics elements into the plurality of symbol sequences.

3. The method of claim 1, wherein determining the plurality of vectors representative of the plurality of symbol sequences comprises determining, using a second neural network, a word embedding for each one of the plurality of symbol sequences.

4. The method of claim 1, wherein the first neural network comprises a plurality of subnetworks, wherein each of the subnetworks comprises at least one hidden layer of neurons.

5. The method of claim 4, wherein a first subnetwork of the plurality of subnetworks is to recalculate the plurality of vectors in a direction of increasing or decreasing horizontal coordinates of the vectors, and wherein a second subnetwork of the plurality of subnetworks is to recalculate the plurality of vectors in a direction of increasing or decreasing vertical coordinates of the vectors.

6. The method of claim 1, wherein determining the association between the first recalculated vector of the plurality of recalculated vectors and the second recalculated vector of the plurality of recalculated vectors comprises:
    generating, by a third neural network, a plurality of association hypotheses, wherein each of the association hypotheses comprises:
        an association of one of the plurality of recalculated vectors with the alphanumeric character; and
        an association of another one of the plurality of recalculated vectors with the table partition;
    determining a probability of occurrence for each of the plurality of association hypotheses; and
    determining that a first association hypothesis of the plurality of association hypotheses has a highest probability of occurrence, wherein the first association hypothesis comprises an association of the first recalculated vector with the second recalculated vector.

7. The method of claim 1, further comprising:
    determining, based on the association between the alphanumeric sequence and the table partition, a location of the table partition; and
    storing the location of the table partition.

8. The method of claim 7, wherein the location of the table partition comprises coordinates of the alphanumeric sequence.

9. The method of claim 7, wherein the location of the table partition comprises a placement of the alphanumeric sequence relative to at least one other symbol sequence of the plurality of symbol sequences.

10. The method of claim 7, further comprising:
    obtaining a subsequent document;
    obtaining a symbol sequence of the subsequent document;
    determining that the symbol sequence of the subsequent document has a location in the subsequent document that coincides, within a pre-determined accuracy, with the location of the table partition; and
    associating the symbol sequence of the subsequent document with the table partition.

11. The method of claim 1, wherein the table graphics element is one of a horizontal line, a vertical line, a corner, a three-way line intersection, or a four-way line intersection.

12. The method of claim 1, wherein the table partition is one of a table cell, a table column, or a table row.

13. A non-transitory machine-readable storage medium including instructions that, when accessed by a processing device, cause the processing device to:
    obtain a plurality of symbol sequences of a document, the document having at least one table, wherein each symbol sequence comprises at least one of an alphanumeric character or a table graphics element;
    determine a plurality of vectors, wherein a vector of the plurality of vectors is representative of one of the plurality of symbol sequences;
    process, by a processing device, the plurality of vectors using a first neural network to obtain a plurality of recalculated vectors, wherein each of the plurality of recalculated vectors is recalculated based on values of the plurality of vectors;
    determine, by the processing device, an association between a first recalculated vector of the plurality of recalculated vectors and a second recalculated vector of the plurality of recalculated vectors, wherein the first recalculated vector is representative of an alphanumeric sequence and the second recalculated vector is associated with a table partition; and determine, based on the association between the first recalculated vector and the second recalculated vector, an association between the alphanumeric sequence and the table partition.

14. The non-transitory machine-readable storage medium of claim 13, wherein to cause the processing device to obtain the plurality of symbol sequences of the document the instructions are to cause the processing device to:

perform optical character recognition (OCR) of an image of the document to obtain an OCR text of the document and a plurality of table graphics elements; and partition the OCR text and the plurality of table graphics elements into the plurality of symbol sequences.

15. The non-transitory machine-readable storage medium of claim 13, wherein to cause the processing device to determine the association between the first recalculated vector of the plurality of recalculated vectors and the second recalculated vector of the plurality of recalculated vectors the instructions are to cause the processing device to:

generate, by a third neural network, a plurality of association hypotheses, wherein each of the association hypotheses comprises:

an association of one of the plurality of recalculated vectors with the alphanumeric character; and an association of another one of the plurality of recalculated vectors with the table partition;

determine a probability of occurrence for each of the plurality of association hypotheses; and determine that a first association hypothesis of the plurality of association hypotheses has a highest probability of occurrence, wherein the first association hypothesis comprises an association of the first recalculated vector with the second recalculated vector.

16. The non-transitory machine-readable storage medium of claim 13, wherein the table graphics element is one of a horizontal line, a vertical line, a corner, a three-way line intersection, or a four-way line intersection, and wherein the table partition is one of a table cell, a table column, or a table row.

17. A system comprising:

a memory; and a processing device operatively coupled to the memory, the processing device to:

obtain a plurality of symbol sequences of a document, the document having at least one table, wherein each symbol sequence comprises at least one of an alphanumeric character or a table graphics element;

determine a plurality of vectors, wherein a vector of the plurality of vectors is representative of one of the plurality of symbol sequences;

process, by a processing device, the plurality of vectors using a first neural network to obtain a plurality of recalculated vectors, wherein each of the plurality of recalculated vectors is recalculated based on values of the plurality of vectors;

determine, by the processing device, an association between a first recalculated vector of the plurality of recalculated vectors and a second recalculated vector of the plurality of recalculated vectors, wherein the first recalculated vector is representative of an alphanumeric sequence and the second recalculated vector is associated with a table partition; and determine, based on the association between the first recalculated vector and the second recalculated vector, an association between the alphanumeric sequence and the table partition.

18. The system of claim 17, wherein to obtain the plurality of symbol sequences of the document the processing device is to:

perform optical character recognition (OCR) of an image of the document to obtain an OCR text of the document and a plurality of table graphics elements; and partition the OCR text and the plurality of table graphics elements into the plurality of symbol sequences.

19. The system of claim 17, wherein to determine the association between the first recalculated vector of the plurality of recalculated vectors and the second recalculated vector of the plurality of recalculated vectors the processing device is to:

generate, by a third neural network, a plurality of association hypotheses, wherein each of the association hypotheses comprises:

an association of one of the plurality of recalculated vectors with the alphanumeric character; and an association of another one of the plurality of recalculated vectors with the table partition;

determine a probability of occurrence for each of the plurality of association hypotheses; and determine that a first association hypothesis of the plurality of association hypotheses has a highest probability of occurrence, wherein the first association hypothesis comprises an association of the first recalculated vector with the second recalculated vector.

20. The system of claim 17, wherein the table graphics element is one of a horizontal line, a vertical line, a corner, a three-way line intersection, or a four-way line intersection, and wherein the table partition is one of a table cell, a table column, or a table row.

* * * * *